United States Patent
Walker et al.

(10) Patent No.: US 11,945,557 B2
(45) Date of Patent: Apr. 2, 2024

(54) SUSPENSION SYSTEM WITH PITCH AND ROLL ADJUSTMENT

(71) Applicant: Nauti-Craft Pty Ltd, Dunsborough (AU)

(72) Inventors: Laurence John Walker, Dunsborough (AU); Michael James Longman, Dunsborough (AU); Richard Monk, Yalyalup (AU); Ross McNab, Yallingup (AU)

(73) Assignee: Nauti-Craft Pty Ltd, Dunsborough (AU)

( * ) Notice: Subject to any disclaimer, the term of this patent is extended or adjusted under 35 U.S.C. 154(b) by 268 days.

(21) Appl. No.: 17/299,918

(22) PCT Filed: Dec. 6, 2019

(86) PCT No.: PCT/AU2019/051344
§ 371 (c)(1),
(2) Date: Jun. 4, 2021

(87) PCT Pub. No.: WO2020/113287
PCT Pub. Date: Jun. 11, 2020

(65) Prior Publication Data
US 2022/0380004 A1    Dec. 1, 2022

(30) Foreign Application Priority Data

Dec. 7, 2018 (AU) ................................. 2018904680

(51) Int. Cl.
*B63B 39/03*    (2006.01)
*B63B 39/10*    (2006.01)

(52) U.S. Cl.
CPC ........ *B63B 39/03* (2013.01); *B63B 2039/105* (2013.01)

(58) Field of Classification Search
CPC .... B63B 39/00; B63B 39/03; B63B 2039/105
(Continued)

(56) References Cited

U.S. PATENT DOCUMENTS 2,184,202 A * 12/1939 Tschanz ................ B60G 21/06
                                                            280/5.506
3,356,954 A    12/1967 Gottschalk
(Continued)

FOREIGN PATENT DOCUMENTS

EP              1426212 B1    5/2006
WO        2011143694 A1   11/2011
(Continued)

OTHER PUBLICATIONS

International Search Report and Written Opinion for Application No. PCT/AU2019/051344 dated Feb. 17, 2020 (16 pages).
(Continued)

*Primary Examiner* — Lars A Olson
(74) *Attorney, Agent, or Firm* — Michael Best & Friedrich LLP

(57) ABSTRACT

A suspension system for supporting a body relative to at least four points, including: a respective front left, front right, back left and back right support arrangement between the respective point and the body, each respective support arrangement including a respective resilience arrangement and a respective control ram, each respective control ram including a respective compression chamber forming at least part of a respective compression control volume; a control arrangement including a first and a second diagonal reversible pump for displacing fluid between diagonally opposite compression control volumes. Each respective resilience arrangement can include a respective damping arrangement to restrict and/or selectively prevent compression and/or expansion of at least a portion of the respective resilience
(Continued)

arrangement. Each respective control ram can further include a respective rebound chamber, the front control rams being cross connected and the back control rams being cross connected.

24 Claims, 13 Drawing Sheets

(58) Field of Classification Search
    USPC .......................................................... 114/122
    See application file for complete search history.

(56) References Cited

U.S. PATENT DOCUMENTS

| | | | |
|---|---|---|---|
| 3,477,733 | A | 11/1969 | Gottschalk |
| 6,000,702 | A | 12/1999 | Streiter |
| 6,249,728 | B1 | 6/2001 | Streiter |
| 6,264,212 | B1 | 7/2001 | Timony |
| 7,314,014 | B2 | 1/2008 | Heyring et al. |
| 8,355,840 | B2 | 1/2013 | Ammon et al. |
| 8,544,863 | B2 | 10/2013 | Revill et al. |
| 9,061,735 | B2 | 6/2015 | Heyring et al. |
| 9,150,282 | B2 * | 10/2015 | Heyring ............... B63B 39/00 |
| 9,272,753 | B2 | 3/2016 | Heyring et al. |
| 2015/0360532 | A1 | 12/2015 | Kim |

FOREIGN PATENT DOCUMENTS

| | | |
|---|---|---|
| WO | 2015172188 A1 | 11/2015 |
| WO | 2016081990 A1 | 6/2016 |
| WO | 2017147658 A1 | 9/2017 |

OTHER PUBLICATIONS

International Preliminary Report on Patentability for Application No. PCT/AU2019/051344 dated Mar. 1, 2021 (5 pages).

* cited by examiner

SUSPENSION SYSTEM WITH PITCH AND ROLL ADJUSTMENT

TECHNICAL FIELD

The present invention relates to suspension systems for the body of a water-craft or vehicle and specifically relates to suspension systems with adjustment of the pitch and roll attitude of the body.

BACKGROUND

Various arrangements of interconnected suspension systems for supporting the body of a water-craft above four points are shown in the applicant's U.S. Pat. No. 9,061,735. However, in versions where the fluid volumes in the interconnected suspension systems are rapidly adjusted to actively control body attitude, arrangements are provided in which one or more powered dumbbell devices control individual suspension modes such as roll and pitch.

Active Body Control using an adjustable ram in series with a resilient member such as a coil spring at all four corners of a vehicle is well known and is disclosed for example in U.S. Pat. Nos. 6,000,702, 6,249,728 and 8,355,840. However, the height of each corner is individually controlled using a valve manifold, a pressure source and a reservoir.

SUMMARY OF INVENTION

According to a first aspect of the invention there is provided a suspension system for supporting a body relative to at least four points, the at least four points including a front left point, a front right point, a back left point and a back right point, the suspension system including: a front left support arrangement between the front left point and the body, a front right support arrangement between the front right point and the body, a back left support arrangement between the back left point and the body and a back right support arrangement between the back right point and the body; each respective front left, front right, back left and back right support arrangement including a respective resilience arrangement and a respective control ram, each control ram including a respective compression chamber forming at least part of a respective compression control volume, each resilience arrangement acting on the respective compression control volume; a control arrangement including a first diagonal reversible pump for displacing fluid between the front left compression control volume and the back right compression control volume and a second diagonal reversible pump for displacing fluid between the front right compression control volume and the back left compression control volume; wherein at least one of the respective resilience arrangements includes a respective damping arrangement to controllably restrict and/or selectively prevent compression and/or expansion of at least a portion of the respective resilience arrangement. This arrangement may provide that driving both the first and second diagonal reversible pumps in a first direction adjusts a pitch attitude of the body, and such that driving the first diagonal reversible pump in the first direction and driving the second diagonal reversible pump in an opposite (or second) direction adjusts a roll attitude of the body.

The controllable restriction and/or selectable prevention of compression and/or expansion of at least a portion of the respective resilience arrangement by the respective damping arrangement may be controlled in dependence on an operational mode of the control arrangement, or in dependence on an operator input and/or at least one operational parameter such as speed, lateral acceleration, steering position, input size, input frequency, body motion amplitude and/or frequency.

Each respective damping arrangement may include a variable or controllable restriction to vary the amplitude, speed and/or acceleration (or rate of change of acceleration or frequency) of the compression and/or expansion of at least a portion of the respective resilience arrangement. The variable or controllable restriction may be varied or controlled at least in dependence on an operational mode of the control arrangement, an operator input and/or at least one operational parameter. Additionally or alternatively, each respective damping arrangement may include a lockout to selectively prevent compression and/or expansion of at least a portion of the respective resilience arrangement in dependence on an operational mode of the control arrangement, an operator input and/or at least one operational parameter.

The control arrangement may include at least a transit mode in which the roll attitude of the body is adjusted to roll the body into a turn. For example, it may provide a coordinated turn at least on some occasions such as up to a predetermined travel limit or lateral acceleration.

Additionally or alternatively, the control arrangement may include at least a loitering mode in which the roll attitude and the pitch attitude of the body are adjusted to substantially maintain roll and pitch attitude of the body. For example, it may provide a pitch and roll stabilised platform when stationary or moving in displacement mode, i.e. at low or zero speed.

Additionally or alternatively, the control arrangement includes at least a transfer mode in which the roll attitude and/or the pitch attitude of the body is adjusted. For example, the roll and pitch attitude of the body can be adjusted to minimise relative vertical displacement between a (specific) point on the body and a point on an adjacent body or structure.

The body may be a chassis of a water-craft and the at least four points may include a front left point and a back left point located on at least one left hull and a front right point and a back right point located on at least one right hull. The at least at least one left hull may be a single left hull and the at least one right hull may be a single right hull. Alternatively, the at least at least one left hull may be a front left hull on which the front left point is located and a back left hull on which the back left point is located; and the at least one right hull may be a front right hull on which the front right point is located and a back right hull on which the back right point is located. In either case the body may in use be completely suspended above a water surface, or engage with the water surface, for example if the body incorporates a fixed hull portion.

Alternatively, the body may be a chassis of a vehicle and the front left point may be located on a front left wheel assembly, the back left point may be located on a back left wheel assembly, the front right point may be located on a front right wheel assembly and the back right point may be located on a back right wheel assembly. The vehicle may be a road-going vehicle such as a car, van or truck, or it may be an earth-moving vehicle such as a grader or mining truck, or it may be an agricultural vehicle such as a tractor.

The respective resilience arrangement may include a respective resilient support. The respective resilient support may include a coil spring. Alternatively or additionally, the respective resilient support may include a pneumatic spring, such as for example an air spring. Alternatively or additionally, the respective resilient support may include a hydraulic cylinder in at least selective communication with a fluid pressure accumulator.

The respective control ram may be in series with the respective resilient support of the respective support arrangement. Alternatively, the respective control ram may be in parallel with the respective resilient support of the respective support arrangement. The respective damping arrangement may include a shock absorber in parallel with the respective resilient support of the respective support arrangement.

Each respective resilience arrangement may include a respective fluid pressure accumulator in at least controllable or selective fluid communication with the respective compression control volume. Each respective damping arrangement may include a respective orifice and/or damper valve to control said controllable or selective fluid communication between the respective fluid pressure accumulator and the respective compression control volume. Alternatively, or additionally, each respective damping arrangement may include a respective lockout valve to control said controllable or selective fluid communication between the respective fluid pressure accumulator and the respective compression control volume.

Each respective control ram may be a single-acting ram.

Alternatively, each respective control ram may be a double-acting ram and include a respective rebound chamber: the rebound chamber of the front left control ram being in fluid communication with the compression chamber of the back right control ram forming the back right compression control volume; the rebound chamber of the front right control ram being in fluid communication with the compression chamber of the back left control ram forming the back left compression control volume; the rebound chamber of the back left control ram being in fluid communication with the compression chamber of the front right control ram forming the front right compression control volume; and the rebound chamber of the back right left control ram being in fluid communication with the compression chamber of the front left control ram forming the front left compression control volume. In each control ram, a pressure area of the rebound chamber may be equal to a pressure area of the compression chamber.

The suspension system may further include a heave ram including four system pressure chambers and a heave pressure chamber, each of the four system chambers being connected to a respective one of the front left, front right, back left and back right compression control volumes, and a heave fluid pressure accumulator in direct or indirect fluid communication with the heave pressure chamber. A heave reversible pump may be provided between the heave pressure chamber and the heave fluid pressure accumulator for displacing fluid therebetween. Such as heave reversible pump arrangement can enable the height of the body to be adjusted.

Alternatively, in one or more forms of the present invention: each respective front left, front right, back left or back right control ram may further include a respective rebound chamber; the front left compression chamber and the front right rebound chamber being in fluid communication and forming at least a part of the front left compression control volume; the front right compression chamber and the front left rebound chamber being in fluid communication forming at least part of the front right compression control volume; the back left compression chamber and the back right rebound chamber being in fluid communication and forming at least a part of the back left compression control volume; and the back right compression chamber and the back left rebound chamber being in fluid communication forming at least part of the back right compression control volume. With resilience provided in each volume, this arrangement passively provides a higher roll and warp stiffness than heave and pitch stiffness.

At least one of said respective front left, front right, back left or back right compression control volumes may be in at least controllable or selective fluid communication with a respective fluid pressure accumulator. For example, each respective compression control volume may be in fluid communication with a respective fluid pressure accumulator. Said fluid communication may be controlled or damped using, for example, a restriction, multi-stage or variable valve. Alternatively or additionally, said fluid communication may be controllably or selectively blocked or prevented, for example during control of an attitude (roll and/or pitch for example) of the body when the velocity of the body is low or zero, i.e. when the body is substantially at rest.

The control rams may support the body. For example, the body has a weight (due to its mass) and the control rams may support substantially all of the weight of the body. Alternatively, the control rams may support a portion of the weight of the body and the suspension system may further include supports. For example the supports may include a respective resilient support in each of the respective front left, front right, back left and back right support arrangements. Each support may be in parallel with a control ram, i.e. weight of the body may be borne by both the supports and the control rams.

Alternatively, in one of more forms of the present invention, each support arrangement may further include a respective roll ram and a respective pitch ram: each respective roll ram including a respective roll compression chamber and a respective roll rebound chamber, the front left and back left roll compression chambers and the front right and back right roll rebound chambers being in fluid communication and forming a left roll compression volume, the front right and back right roll compression chambers and the front left and back left roll rebound chambers being in fluid communication forming a right roll compression volume; each respective pitch ram including at least a respective pitch compression chamber, the front left and front right pitch compression chambers being in fluid communication forming a front pitch compression volume, the back left and back right pitch compression chambers being in fluid communication forming a back pitch compression volume. In this case the roll and pitch rams may provide zero warp stiffness due to the interconnections specified.

Each respective pitch ram may further include a respective pitch rebound chamber, the front left and front right pitch rebound chambers forming part of the back pitch compression volume, the back left and back right pitch rebound chambers forming part of the front pitch compression volume. Alternatively or additionally, in at least one of the respective support arrangements, the respective control ram may be integrated into the respective pitch ram or integrated into the respective roll ram.

A roll reversible pump may be connected between the left roll compression volume and the right roll compression volume. This can be used to enable active roll attitude adjustment using the roll rams, such as roll-in of the chassis of a vessel during transit where sustained roll attitude control forces can be required for the duration of a turn for example.

One or more forms of the present invention may include a warp load distribution unit comprising at least a front left system chamber, a front right system chamber, a back left system chamber and a back right system chamber defined by at least two movable members, each respective system chamber being in fluid communication with the respective compression control volume, the at least two movable members being fluidly or mechanically interconnected such that motion of one of the movable members urges motion of the other movable member, the front left system chamber varying in volume in the same direction as the back right system chamber in the opposite direction to the front right and back left system chambers. The warp load distribution unit in this arrangement can passively allow the effective transfer of fluid between the front left/back right diagonal pair of control volumes and the front right/back left diagonal pair of control volumes thereby accommodating warp motions of the control rams. i.e. as the front left system chamber increases in volume, the back right system chamber also increases in volume and the front right and back left system chambers decrease in volume.

The warp load distribution unit may comprise a first cylinder and a second cylinder axially aligned with the first cylinder, the at least two movable members being a first piston and a second piston: the first piston being slidably located in the first cylinder and forming a first chamber and a second chamber in the first cylinder; the second piston being slidably located in the second cylinder and forming a first chamber and a second chamber in the second cylinder; the first piston being mechanically connected to the second piston by a rod.

The rod may extend through the second chamber of the first cylinder and through the first chamber of the second cylinder. The first chamber of the first cylinder may be the front left system chamber, the second chamber of the first cylinder may be the back left system chamber, the first chamber of the second cylinder may be the back right system chamber, and the second chamber of the second cylinder may be the front right system chamber.

Alternatively, the rod may extend through both the first and second chambers of both of the first cylinder and the second cylinder. The first chamber of the first cylinder may be the front left system chamber, the second chamber of the first cylinder may be the front right system chamber, the first chamber of the second cylinder may be the back right system chamber, and the second chamber of the second cylinder may be the back left system chamber.

Each respective control ram may be a single-acting ram. Alternatively, each respective control ram may be a double-acting ram including a respective rebound chamber: the rebound chamber of the front left control ram being in fluid communication with the compression chamber of the back right control ram forming the back right compression control volume; the rebound chamber of the front right control ram being in fluid communication with the compression chamber of the back left control ram forming the back left compression control volume; the rebound chamber of the back left control ram being in fluid communication with the compression chamber of the front right control ram forming the front right compression control volume; and the rebound chamber of the back right left control ram being in fluid communication with the compression chamber of the front left control ram forming the front left compression control volume.

The warp load distribution unit may comprise first, second, third and fourth cylinders, the first and second cylinders being axially aligned with each other and the third and fourth cylinders being axially aligned with each other. The at least two movable members may include a first piston slidably located in the second cylinder and a second piston slidably located in the third cylinder; the first piston defining the back right system chamber and a first diagonal heave chamber in the second cylinder, a first rod extending from the first piston through the back right system chamber into the first cylinder, defining the front left system chamber; the second piston defining the back left system chamber and a second diagonal heave chamber in the third cylinder, a second rod extending from the second piston through the back left system chamber into the fourth cylinder, defining the front right system chamber. The first and second diagonal heave chambers may be connected by a heave conduit. In this arrangement, warp motions displace fluid between the first and second diagonal heave chambers.

A heave fluid pressure accumulator may be provided in fluid communication with the heave conduit. Alternatively or additionally, a heave reversible pump with heave adjustment accumulator may be provided in fluid communication with the heave conduit, the heave reversible pump being connected between the heave adjustment accumulator and the heave conduit to thereby enable control of fluid flow therebetween and adjustment of the heave position of the body relative to the front left, front right, back left and back right points.

At least one respective fluid pressure accumulator may be provided for at least one of the front left, front right, back left or back right compression control volumes respectively. For example, each respective compression control volume may be in fluid communication with a respective fluid pressure accumulator. Said fluid communication may be damped using, for example, a restriction or variable valve. Alternatively or additionally, said fluid communication may be selectively blocked or prevented. For example fluid communication between at least one fluid pressure accumulator and its respective compression control volume may be blocked or prevented when the body is substantially at rest, i.e. ideally when impact loads are not peaking, and/or when the attitude of the body is being actively controlled as resilience adds phase lag into the control.

Another aspect of the present invention provides a suspension system for supporting a body relative to at least four points, the at least four points including a front left point, a front right point, a back left point and a back right point, the suspension system including: a front left support arrangement between the front left point and the body, a front right support arrangement between the front right point and the body, a back left support arrangement between the back left point and the body and a back right support arrangement between the back right point and the body; each respective front left, front right, back left and back right support arrangement including a respective control ram, each control ram including a respective compression chamber forming at least part of a respective compression control volume; a control arrangement including a first diagonal reversible pump for displacing fluid between the front left compression control volume and the back right compression control volume and a second diagonal reversible pump for displacing fluid between the front right compression control volume and the back left compression control volume; wherein each respective front left, front right, back left or back right control ram further includes a respective rebound chamber, the front left compression chamber and the front right rebound chamber being in fluid communication and forming at least a part of the front left compression control volume, the front right compression chamber and the front left rebound chamber being in fluid communication forming at least part of the front right compression control volume, the back left compression chamber and the back right rebound chamber being in fluid communication and forming at least a part of the back left compression control volume, the back right compression chamber and the back left rebound chamber being in fluid communication forming at least part of the back right compression control volume.

This arrangement of interconnected double-acting control rams can inherently (i.e. passively) provide a higher passive roll and warp stiffness than heave and pitch stiffness due to any resilience in the system (such as flexible hoses) or fluid. This arrangement may provide that driving both the first and second diagonal reversible pumps in a first direction adjusts a pitch attitude of the body, and such that driving the first diagonal reversible pump in the first direction and driving the second diagonal reversible pump in an opposite (or second) direction adjusts a roll attitude of the body.

Each support arrangement may include a respective resilience arrangement acting on the respective compression control volume. Each support arrangement may also include a respective damping arrangement to controllably restrict and/or selectively prevent compression and/or expansion of at least a portion of the respective resilience arrangement. The controllable restriction and/or selectable prevention of compression of at least a portion of the respective resilience arrangement by the respective damping arrangement may be controlled in dependence on an operational mode of the control arrangement and/or in dependence on an operator input and/or at least one operational parameter such as speed, lateral acceleration, steering position, input size, input frequency, body motion amplitude and/or frequency.

Each respective damping arrangement may include a variable or controllable restriction to vary the amplitude, speed and/or acceleration (or rate of change of acceleration or frequency) of the compression and/or expansion of at least a portion of the respective resilience arrangement, the variable or controllable restriction being varied or controlled at least in dependence on an operational mode of the control arrangement, an operator input and/or at least one operational parameter such as speed, lateral acceleration, steering position, input size, input frequency, body motion amplitude and/or frequency. Additionally or alternatively, each damping arrangement may include a respective lockout to selectively prevent compression and/or expansion of at least a portion of the respective resilience arrangement in dependence on an operational mode of the control arrangement, an operator input and/or at least one operational parameter such as speed, lateral acceleration, steering position, input size, input frequency, body motion amplitude and/or frequency.

The control arrangement may include at least a transit mode in which the roll attitude of the body is adjusted to roll the body into a turn. For example, it may provide a coordinated turn at least on some occasions such as up to a predetermined travel limit or lateral acceleration.

Additionally or alternatively, the control arrangement may include at least a loitering mode in which the roll attitude and the pitch attitude of the body are adjusted to substantially maintain roll and pitch attitude of the body. For example, it may provide a pitch and roll stabilised platform when stationary or moving in displacement mode, i.e. at low or zero speed.

Additionally or alternatively, the control arrangement may include at least a transfer mode in which the roll attitude and/or the pitch attitude of the body is adjusted. For example, the roll and pitch attitude of the body can be adjusted to minimise relative vertical displacement between a (specific) point on the body and a point on an adjacent body or structure.

Each resilience arrangement may include a respective fluid pressure accumulator in at least controllable or selective fluid communication with the respective compression control volume. Each damping arrangement may include a respective restriction or damper valve to restrict fluid communication between the respective fluid pressure accumulator and the respective compression control volume. Each restriction or damper valve may be variable or controllable, for example in dependence on an operational mode of the control arrangement, an operator input and/or at least one operational parameter. Additionally or alternatively, each damping arrangement may include a respective lockout valve to selectively limit or prevent fluid communication between the respective fluid pressure accumulator and the respective compression control volume. Each lockout valve may be controlled in dependence on, for example, an operational mode of the control arrangement, an operator input and/or at least one operational parameter.

The body may be a chassis of a water-craft and the at least four points may include a front left point and a back left point located on at least one left hull and a front right point and a back right point located on at least one right hull. The at least at least one left hull may be a single left hull and the at least one right hull may be a single right hull. Alternatively, the at least at least one left hull may be a front left hull on which the front left point is located and a back left hull on which the back left point is located; and the at least one right hull may be a front right hull on which the front right point is located and a back right hull on which the back right point is located.

Alternatively, the body may be a chassis of a vehicle and the front left point may be located on a front left wheel assembly, the back left point may be located on a back left wheel assembly, the front right point may be located on a front right wheel assembly and the back right point may be located on a back right wheel assembly.

Another aspect of the invention provides a suspension system for supporting a body relative to at least four points, the at least four points including a front left point, a front right point, a back left point and a back right point, the suspension system including: a front left support arrangement between the front left point and the body, a front right support arrangement between the front right point and the body, a back left support arrangement between the back left point and the body and a back right support arrangement between the back right point and the body; each respective front left, front right, back left and back right support arrangement including a respective resilience arrangement and a respective control ram, each control ram including a respective compression chamber forming at least part of a respective compression control volume, each resilience arrangement having an associated amount of resilience and each resilience arrangement acting on the respective compression control volume; a control arrangement including a first diagonal reversible pump for displacing fluid between the front left compression control volume and the back right compression control volume and a second diagonal reversible pump for displacing fluid between the front right compression control volume and the back left compression control volume; wherein at least one of the resilience arrangements includes a damping arrangement arranged to facilitate controllable modification of the amount of resilience acting on the respective compression control volume.

Another aspect of the present invention provides a suspension system as described in the following description or shown in the accompanying drawings.

It will be convenient to further describe the invention by reference to the accompanying drawings which illustrate preferred aspects of the invention. Other embodiment of the invention are possible and consequently particularity of the accompanying drawings is not to be understood as superseding the generality of the preceding description of the invention.

DESCRIPTION OF PREFERRED EMBODIMENT

Figure 1:
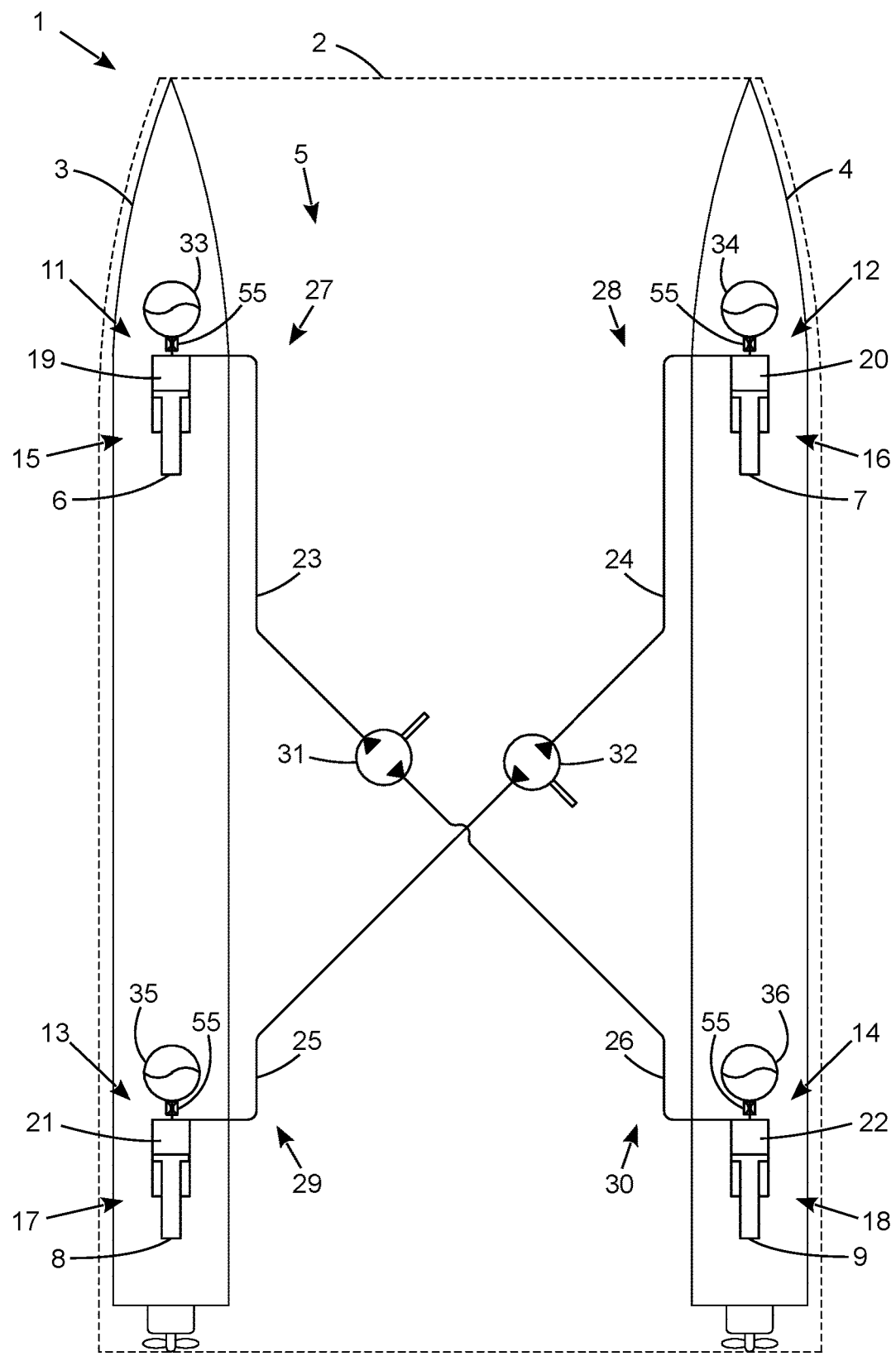
FIG. 1 is a schematic view of a catamaran incorporating a first possible form of the present invention.

Referring initially to FIG. 1, there is shown a water-craft 1 having a body or chassis 2, a left hull 3 and a right hull 4. A suspension system 5 provides at least partial support of the body or chassis 2 relative to the left and right hulls 3 and 4. For example, if the body includes a water-engaging portion, such as a fixed central hull for example, that occasionally or permanently engages with the water upon which the watercraft floats in use, then the body or chassis may be only partially supported by the suspension system relative to the left and right hulls. However if the body is for example positioned above the left and right hulls, the body or chassis can be totally supported above the left and right hulls. The hulls can be located relative to the body by any known mechanism or suspension geometry, such as any of the arrangements disclosed in the Applicant's U.S. Pat. No. 9,272,753, international patent publication number WO2017/147658 or Australian provisional patent application number 2016904236 for example.

The suspension system 5 supports the body or chassis 2 relative to four points distributed on the hulls, those four points being a front left point 6 forward of a back left point 8 on the left hull 3 and a front right point 7 forward of a back right point 9 on the right hull 4. The suspension system 5 includes: a front left support arrangement 11 between the front left point 6 and the chassis 2; a front right support arrangement 12 between the front right point 7 and the chassis 2; a back left support arrangement 13 between the back left point 8 and the chassis 2; and a back right support arrangement 14 between the back right point 9 and the chassis 2. Each support arrangement includes a respective control ram, in this example being a single-acting ram which can utilise the rebound chamber for rebound damping with valving provided across the piston as is well known. The front left control ram 15 includes a front left compression chamber 19 connected to a front left compression conduit 23 forming a front left compression control volume 27. The front right control ram 16 includes a front right compression chamber 20 connected to a front right compression conduit 24 forming a front right compression control volume 28. The back left control ram 17 includes a back left compression chamber 21 connected to a back left compression conduit 25 forming a back left compression control volume 29. The back right control ram 18 includes a back right compression chamber 22 connected to a back right compression conduit 26 forming a back right compression control volume 30.

A first diagonal reversible pump 31 is connected between the front left compression conduit 23 and the back right compression conduit 26 to enable fluid to be transferred between the front left compression control volume 27 and the back right compression control volume 30. A second diagonal reversible pump 32 is connected between the front right compression conduit 24 and the back left compression conduit 25 to enable fluid to be transferred between the front right compression control volume 28 and the back left compression control volume 29. The four possible permutations of simultaneously running the two pumps 31, 32 forwards or backwards gives the four chassis displacements of roll to the left and the right and pitch to the front and the back.

For example, running both the first and the second diagonal reversible pumps 31, 32 in the same direction, i.e. in a first direction, may pump fluid from the back right and back left compression control volumes 30, 29 into the front left and front right compression control volumes 27, 28 causing the chassis to pitch to the back, i.e. nose up. In that case running both the first and the second diagonal reversible pumps 31, 32 in reverse, i.e. in a second direction which is opposite to the first direction, may pump fluid from the front left and front right compression control volumes 27, 28 into the back right and back left compression control volumes 30, 29 causing the chassis 2 to pitch to the front, i.e. nose down. Running the first diagonal reversible pump 31 in an opposite direction to the second diagonal reversible pump 32, i.e. running the first diagonal reversible pump in the first direction and the second diagonal reversible pump in the second direction may pump fluid from the back right and front right compression control volumes 30, 28 into the front left and back left compression control volumes 27, 29 causing the chassis 2 to roll to the right. Similarly the chassis can be rolled to the left relative to the four points on the hulls by driving the first diagonal reversible pump in the second direction and the second diagonal reversible pump in the first direction. If the definitions of what is the first direction of one of the pumps is changed, then the roll outcome will instead be a pitch outcome for example.

There are two known ways in which to reverse pump flow direction. The first is to use a pump that always pumps in the direction determined by the driving motor direction, in which case to reverse the direction of the pump, the motor direction is reversed. The second is to use a pump that can vary flow direction with a constant direction input from the motor, i.e. the flow direction can be changed without the motor direction changing. For example, if reversible variable swash plate pumps are used, the flow rate and flow direction of the pump can be changed without changing motor spin direction. This can allow multiple pumps to be driven off (or by) a single motor with each pump being independently controlled for flow rate and flow direction as required.

If a roll to the left with a pitch to the front is required, only the first diagonal pump may be required to be driven. For example, continuing the example above, if the first diagonal reversible pump 31 is driven in the second direction then fluid will be displaced from the front left compression control volume 27 into the back right compression control volume 30. Any combination of varying magnitudes of first and second direction (i.e. forward and reverse) running of the first and second diagonal reversible pumps can provide any desired combination of roll and/or pitch attitude adjustment of the chassis 2 relative the four points 6, 7, 8, 9 on the left and right hulls.

The first and second diagonal reversible pumps 31, 32 can be used to adjust the attitude of the chassis 2 during transfers, i.e. when adjacent a fixed object such as a wind turbine pylon or a dock, or when adjacent a floating object such as another vessel or a pontoon. The first and second diagonal reversible pumps can be controlled to adjust the chassis relative the four points 6, 7, 8, 9 using the control rams 15, 16, 17, 18 to maintain or minimise the variation between a point of the chassis such as the mid-point of the bow and a point on the adjacent fixed or floating object. Alternatively or additionally, the first and second diagonal reversible pumps 31, 32 can be used to adjust the attitude of the chassis 2 during transit (i.e. under-way) and/or while stationary.

Fluid pressure accumulators 33, 34, 35, 36 are shown connected to the respective compression chamber 19, 20, 21, 22 of the respective ram 15, 16, 17, 18. Resilience adds complexity to the control of the first and second diagonal reversible pumps 31, 32 when adjusting roll and pitch attitude of the body, so if the accumulators 33, 34, 35, 36 are provided, then preferably each is connected to the respective compression chamber 19, 20, 21, 22 by a respective damper valve and/or lockout valve. In FIG. 1 damper valves 55 are shown. However in FIG. 2, the fluid pressure accumulators 33, 34, 35, 36 connected to the respective ram compression chamber are shown with a lockout valve 56. This permits the resilience of the respective ram compression chamber accumulator 33, 34, 35, 36 to be isolated. Also shown in FIG. 2 in dashed lines is an optional orifice 57 or damper valve in a bypass around the lockout valve. Such an orifice can be beneficial to allow low flow rates to reduce the pressure differential between the accumulator and the associated compression chamber before the lockout valve is opened. The orifice 57 or damper valve can be controlled to minimise flow when the lockout is closed, but allow a higher flow to allow a faster pressure equalising effect prior to opening of the lockout valve.

The resilience of the ram compression chamber accumulators 33, 34, 35, 36 can be operational while the vessel is in transit, including while the roll attitude of the vessel is controlled to lean the body into turns, such as for example when making a coordinated turn. Such a "roll-in" control does not need to be a high frequency feedback control and does not typically suffer from instability due to the resilience provided by the ram compression chamber accumulators in the roll mode. Conversely, while in a loitering or transfer mode, when the vessel is stationary or moving at very low speeds and when the roll and pitch attitude of the body is being controlled, using the first and second diagonal reversible pumps 31, 32, the resilience of the ram compression chamber accumulators 33, 34, 35, 36 can be restricted using controllable damper valves, isolated using the lockout-valves 56 or restricted orifices 57 bypassing the lockout valves.

An example of transit mode is when a vessel is underway and can be operating in a planing, semi planing or displacement mode of hull operation. An example of loitering mode is when a vessel is stationary and the body or deck is roll and pitch stabilised or compensated. For example, to focus on a distant object using a sight or camera that is on the vessel body, the roll and pitch attitude of the body can be actively controlled to minimise such changes in attitude. An example of transfer mode is when a vessel is adjacent a pylon, a mother vessel, or any other other fixed or floating structure, where vertical variation between a point on the body and point on the adjacent structure in minimised so that people or goods may be transferred. While the vessel is typically stationary or operating at low speed in the loitering and transfer modes, in the loitering mode the body pitch and roll is adjusted to minimise change in roll and pitch attitude of the body. Conversely in transfer mode, the body pitch and/or roll (and optionally heave) can be adjusted to minimise the variation in a vertical distance between a point on the body and a point on the adjacent object or structure.

Figure 2:
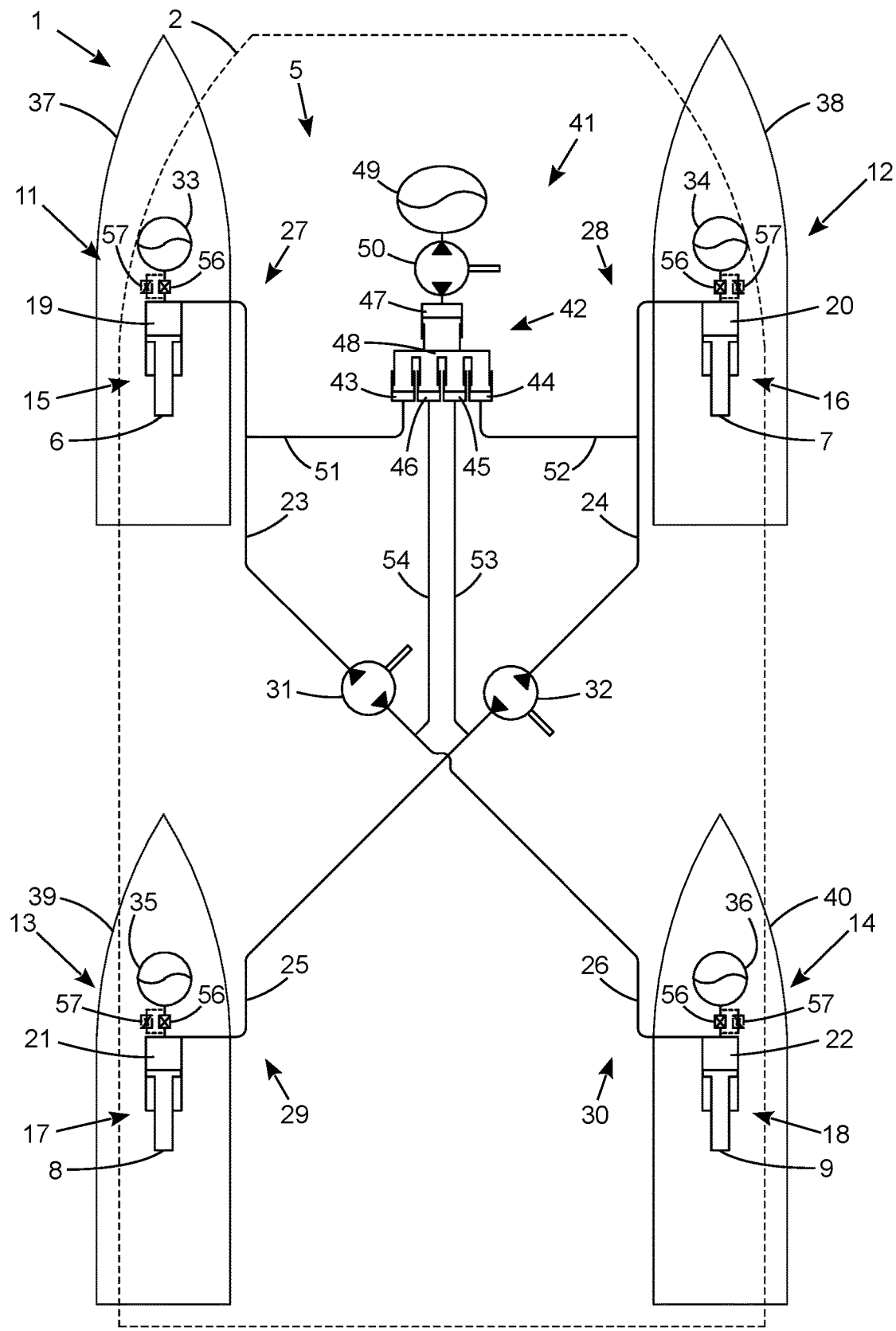
FIG. 2 is a schematic view of a quadmaran incorporating a second possible form of the present invention.

Also in FIG. 2 a heave adjustment is added. As all the suspension arrangements disclosed herein are applicable to any vessels having one or two hulls on or towards each side of the body, the four points are now distributed between four hulls, i.e. the vessel 1 is now a quadmaran. The front left point 6 is on a front left hull 37, the front right point 7 is on a front right hull 38, the back left point 8 is on a back left hull 39, the back right point 9 is on a back right hull 40. Such four-hulled vessels are known from the applicant's U.S. Pat. Nos. 7,314,014 and 9,150,282 for example.

To add the heave adjustment functionality into the arrangement of FIG. 1, in FIG. 2 the heave adjustment arrangement 41 is provided. The heave adjustment arrangement 41 shown in FIG. 2 is similar to a heave adjustment arrangement shown in the applicant's international patent publication number WO2016/081990. The heave ram 42 comprises four smaller cross-section system cylinders and a heave cylinder, all rigidly connected. Similarly each cylinder includes a piston with the four system pistons and the heave piston being rigidly connected as piston assembly 48. The piston in each system cylinder in the heave ram defines a system pressure chamber 43, 44, 45, 46 and the piston in the heave cylinder defines a heave pressure chamber 47. The front left system pressure chamber 43 is connected to the front left compression control volume 27 by a front left heave conduit 51. The front right system pressure chamber 44 is connected to the front right compression control volume 28 by a front right heave conduit 52. The back left system pressure chamber 45 is connected to the back left compression control volume 29 by a back left heave conduit 53. The back right system pressure chamber 46 is connected to the back right compression control volume 30 by a back right heave conduit 54.

As load on the front left, front right, back left and back right support arrangements 11, 12, 13, 14 is increased, the pressure in the respective compression chambers 19, 20, 21, 22 of the respective control rams 15, 16, 17, 18 is correspondingly increased. The respective compression conduits 23, 24, 25, 26 and the respective heave conduits 51, 52, 53, 54 transmit that increased pressure to the respective system pressure chambers 43, 44, 45, 46 in the heave ram 42 which increases the pressure in the heave pressure chamber 47. If the heave reversible pump 50 is omitted and the heave pressure chamber 47 is directly connected to the heave fluid pressure accumulator 49, then the piston assembly 48 displaces until for example the pressure in the heave fluid pressure accumulator 49 is equal to the pressure in the heave pressure chamber 47.

However, if the heave reversible pump is provided as shown in FIG. 2, then driving the heave reversible pump can displace fluid between the heave pressure chamber 47 and the heave pressure accumulator 49 which displaces the piston assembly 48 and simultaneously changes the volume of fluid in each of the front left, front right, back left and back right compression control volumes thereby affecting a change in the height or heave position of the chassis 2 relative to the four points 6, 7, 8, 9. The remainder of the suspension system 5 is the same as that shown in FIG. 1 and operation of the first and second diagonal reversible pumps 31, 32 can also be the same as described with respect to FIG. 1.

Figure 3:
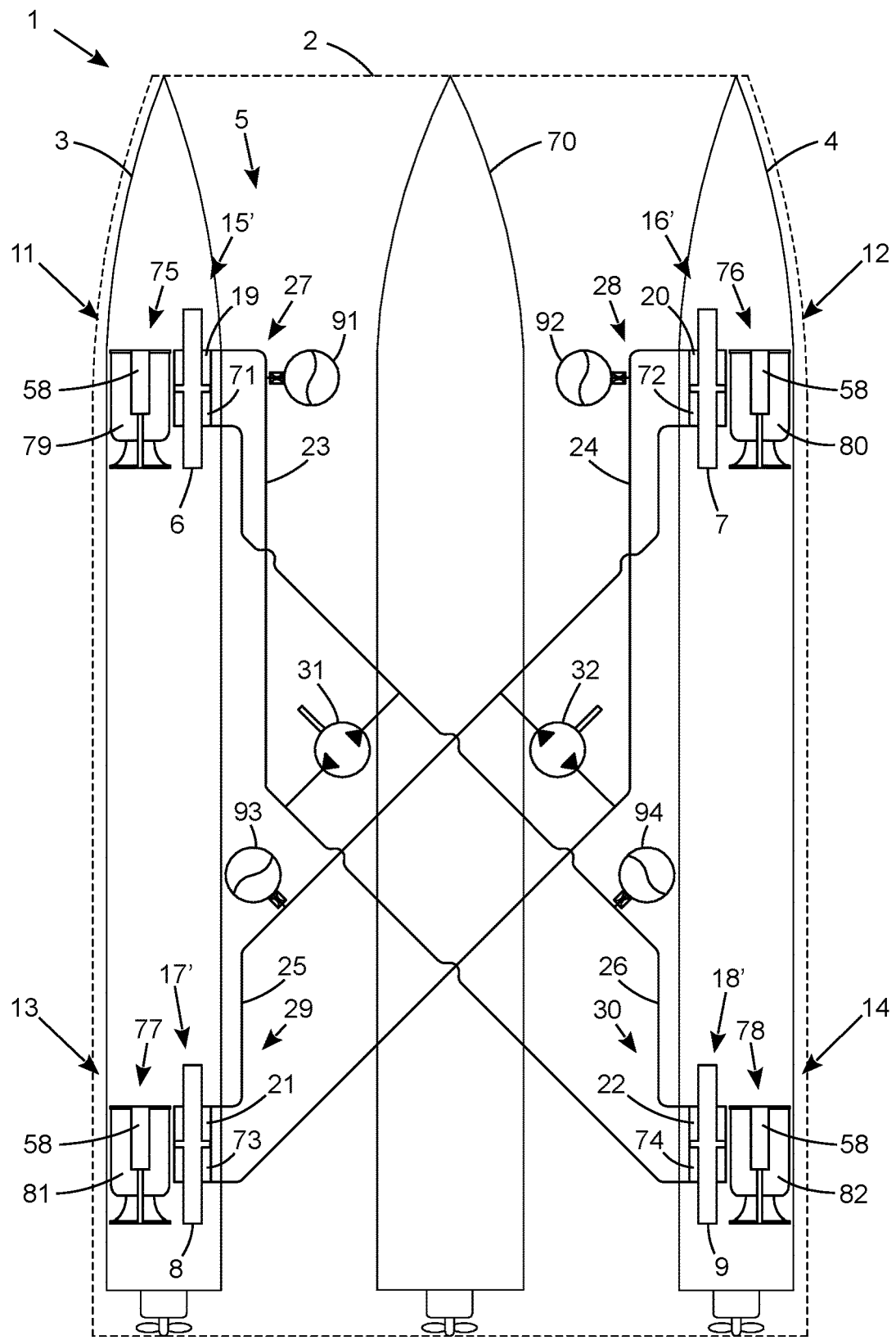
FIG. 3 is a schematic view of a catamaran incorporating a third possible form of the present invention.

FIG. 3 shows an alternative construction of control ram being a double-acting, through-rod (or equal compression and rebound pressure area) style of ram. The suspension system 5 is shown on a trimaran having a central hull 70 which may for example be fixed to the body or chassis 2, so whereas in FIGS. 1 and 2 the chassis may be substantially supported relative to the four points 6, 7, 8, 9 on the two or four hulls, in FIG. 3 some of the mass of the chassis is supported by the integral or fixed central hull 70, so the chassis 2 is only partially supported relative the four points 6, 7, 8, 9 on the left and right hulls 3, 4. Again all of the suspension arrangements detailed herein are suitable for application to this fixed centre hull, one left hull and one right hull configuration and the suspension arrangement shown in FIG. 3 is applicable to vessels having one or two hulls on or towards each side of the body, such as catamarans and quadmarans.

The front left control ram 15' now includes a front left rebound chamber 71 connected to the back right compression control volume 30. Similarly, the front right control ram 16' includes a front right rebound chamber 72 connected to the back left compression control volume 29. The back left control ram 17' includes a back left rebound chamber 73 connected to the front right compression control volume 28. The back right control ram 18' includes a back right rebound chamber connected to the front left compression control volume 27.

Again the connectivity of the first and second diagonal reversible pumps 31, 32 is the same as in FIGS. 1 and 2. That is, the first diagonal reversible pump 31 is connected between the front left compression conduit 23 and the back right compression conduit 26 to enable fluid to be transferred between the front left compression control volume 27 and the back right compression control volume 30. The second diagonal reversible pump 32 is connected between the front right compression conduit 24 and the back left compression conduit 25 to enable fluid to be transferred between the front right compression control volume 28 and the back left compression control volume 29. The operation of the first and second diagonal reversible pumps 31, 32 can also be the same as described with respect to FIG. 1 to provide adjustment of the roll attitude and pitch attitude of the body or chassis 2.

This arrangement of control rams and interconnections can provide zero heave stiffness, i.e. it does not provide vertical support forces, so each respective support arrangement 11, 12, 13, 14 also includes a respective front left, front right, back left or back right resilient support 75, 76, 77, 78, in this example being shown as a front left, front right, back left or back right air spring 79, 80, 81, 82.

Preferably the resilient support 75, 76, 77, 78 is damped. So in parallel with each air spring 79, 80, 81, 82 is a respective shock absorber 58. The shock absorber can be within or alongside the air spring and is shown as a linear type, such as a hydraulic or gas ram with suitable orifices which are preferably controllable. Such a controllable shock absorber or variable damper can be used to damp or restrict the resilience of the resilient supports 75, 76, 77, 78, particularly when the attitude of the body is being controlled, for roll-in during transit or for pitch and roll using the first and second diagonal reversible pumps 31, 32 during at least loitering or transfer.

As the arrangement of control rams and interconnections can provide zero heave stiffness and zero warp stiffness, if a high roll and pitch stiffness is required, no additional resilience may be provided. However due to fluid expansion with temperature, for pressure control an accumulator is a straight-forward way to provide pressure regulation, i.e. the resilience provided by the accumulator will minimise changes in pressure in the compression control volumes 27, 28, 29, 30. Preferably, a respective fluid pressure accumulator 91, 92, 93, 94 is provided for each of the front left, front right, back left and back right compression control volumes. This can not only provide the pressure moderating function with temperature, but also allow a lower roll and pitch stiffness, but the resilience from each accumulator can still be variably, controllably or selectively communicated with the respective compression control volume via a damping arrangement such as a switchable or variable restriction or a lockout valve.

Figure 4:
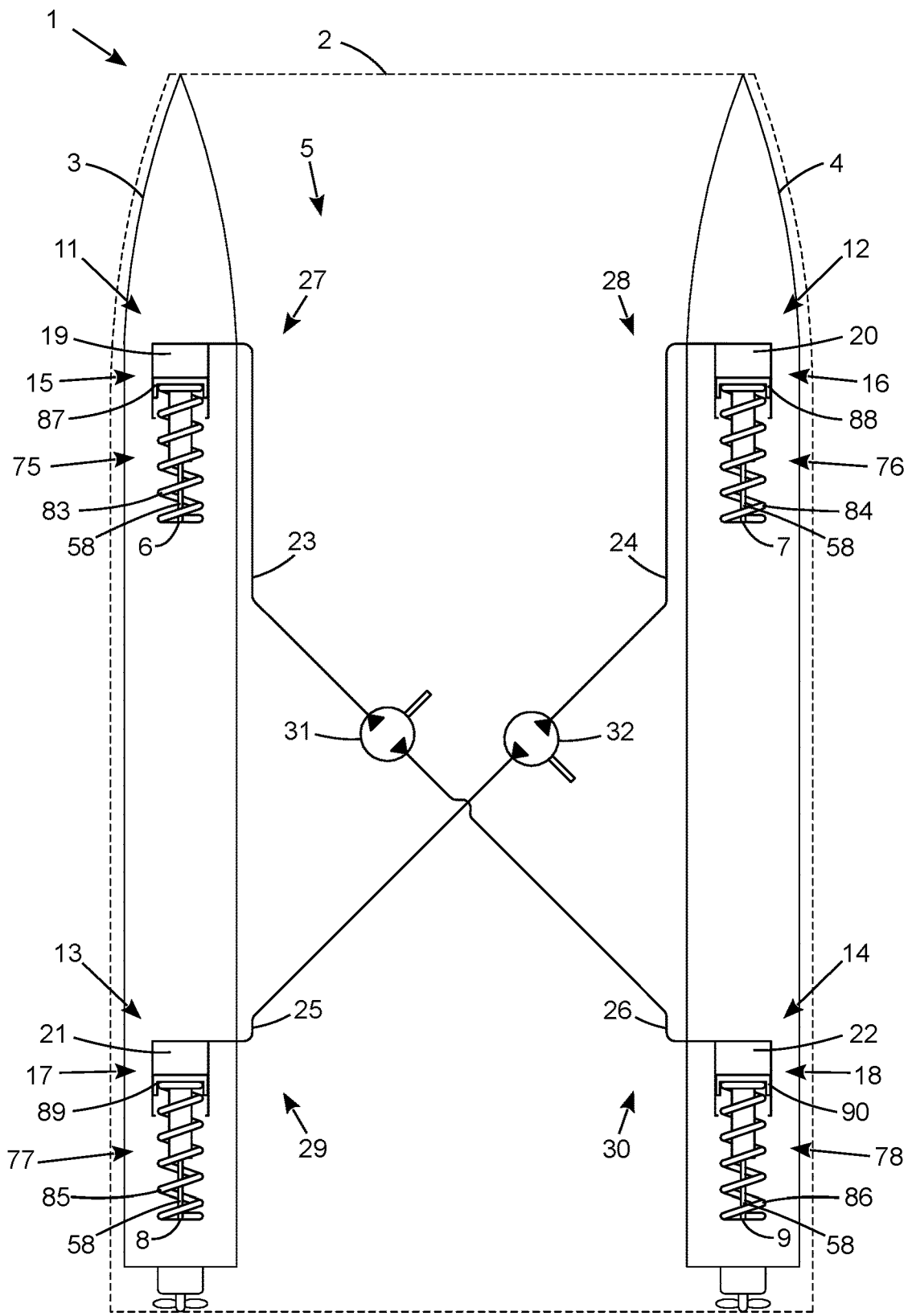
FIG. 4 is a schematic view of a fourth possible form of the present invention.

FIG. 4 shows an alternative arrangement of the suspension system 5 in which the control rams 15, 16, 17, 18 are arranged in series with the resilient supports 75, 76, 77, 78. In this example, the respective front left, front right, back left or back right resilient support 75, 76, 77 or 78 is a respective coil spring 83, 84, 85 or 86 and each respective control ram 15, 16, 17, 18 is a single-acting ram in which the piston provides or is attached to a respective front left, front right, back left or back right spring seat 87, 88, 89 or 90 for the respective coil spring. The first and second diagonal reversible pumps 31, 32 are provided between the front left and back right or between the front right and back left compression control volumes 27 and 28, or 29 and 30, as in FIG. 1 and can be operated in a similar manner.

Although adding resilience 75, 76, 77, 78 in series with the control rams 15, 16, 17, 18 can add a phase lag into the control and make control more complex, the arrangement in FIG. 4 can provide a complete suspension system. Preferably the resilience 75, 76, 77, 78 is damped to reduce control complexity and improve passive operation, using an optional shock absorber 58, shown in this example inside the coil spring in a typical "coil-over" arrangement. When provided, the shock absorber 58 preferably acts in parallel with the resilience of the respective coil spring as shown. Preferably the shock absorber is a variable damper.

If an independent, non-adjustable stiffness resilient support is used, generally the roll stiffness is too low and/or the heave stiffness is too high for practical operation, but adding a pitch and roll adjustment as shown in the suspension system 5 of FIG. 4 permits the roll attitude to be adjusted to at least partially compensate for a low roll stiffness, or actively maintain a substantially level body attitude in roll, or roll into a corner as discussed for example in the Applicant's international patent application publication number WO2015172188. The ability to adjust the attitude of the body in other situations is still available in this suspension configuration also, such as during transfers, i.e. while adjacent to another body such as a wind turbine foundation or another vessel such as a mothership.

Figure 5:
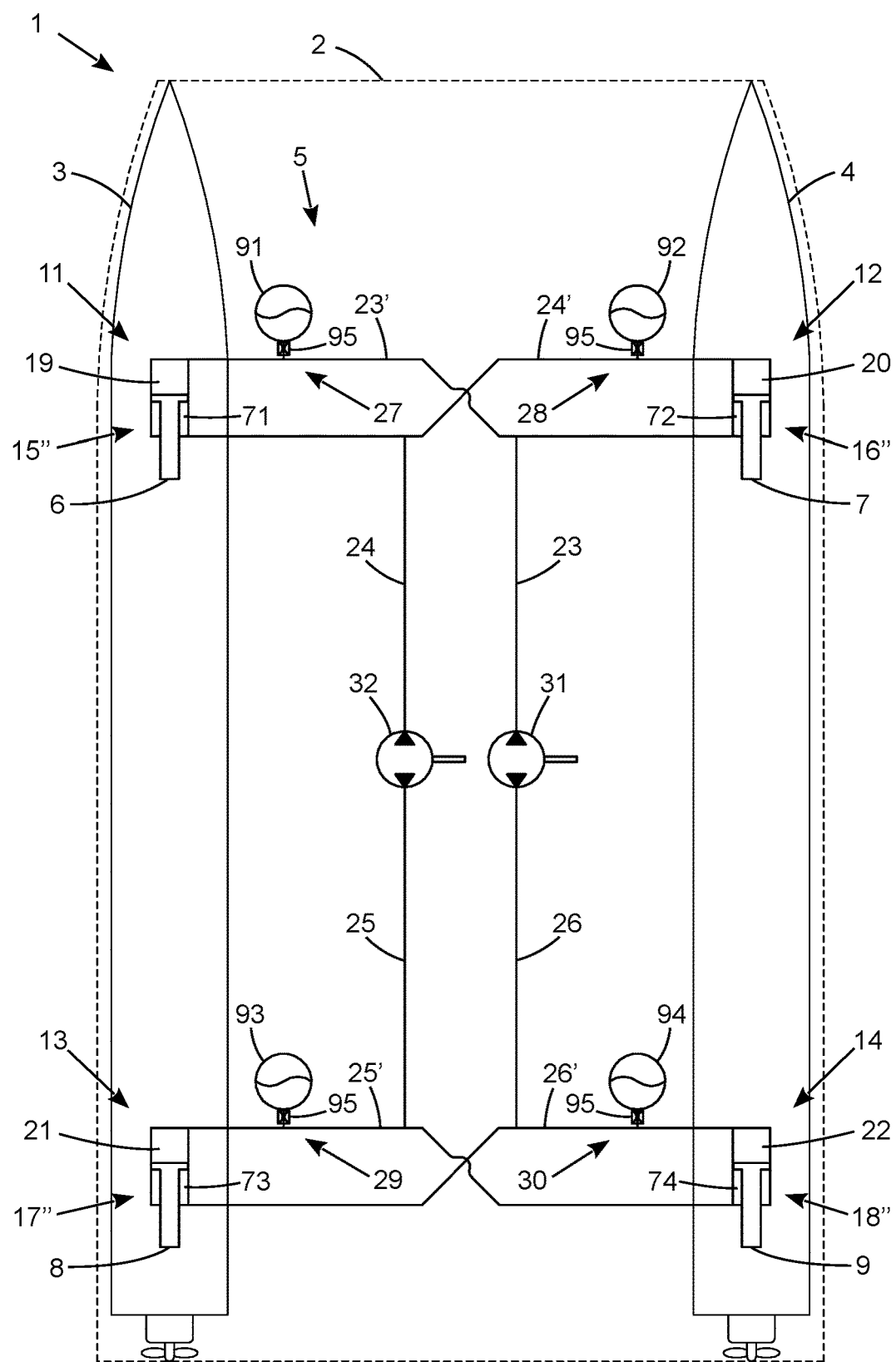
FIG. 5 is a schematic view of a fifth possible form of the present invention.

FIG. 5 shows an alternative construction of double-acting control ram having unequal compression and rebound pressure areas. The suspension system 5 is again shown on a catamaran as in FIGS. 1 and 4, where the body or chassis 2 may be substantially supported relative to the four points 6, 7, 8, 9 on the two hulls by a respective support arrangement 11, 12, 13, 14. The front left control ram 15" now includes a rod extending through the front left rebound chamber 71 but not through the front left compression chamber 19. Each respective control ram 15", 16", 17", 18" has a similar construction where the rod extends through the respective rebound chamber 71, 72, 73, 74 but not through the respective compression chamber 19, 20, 21, 22.

The front double-acting control rams are cross-connected and the back double-acting control rams are cross-connected. More specifically, the front left compression chamber 19 of the front left control ram 15" is connected by the front left system conduit 23' to the front right rebound chamber 72 of the front right control ram 16". The front right compression chamber 20 of the front right control ram 16" is connected by the front right system conduit 24' to the front left rebound chamber 71 of the front left control ram 15". The back left compression chamber 21 of the back left control ram 17" is connected by the back left system conduit 25' to the back right rebound chamber 74 of the back right control ram 18". The back right compression chamber 22 of the back right control ram 18" is connected by the back right system conduit 26' to the back left rebound chamber 73 of the back left control ram 17".

A respective system fluid pressure accumulator 91, 92, 93 or 94 is preferably provided in fluid communication with the respective front left, front right, back left or back right system conduit 23', 24', 25' or 26'. Although the accumulators are optional, some form of resilience is required if the control rams provide constant or the majority of the support of the body 2. The or each respective system fluid pressure accumulator may be switched by a valve and/or damped using a variable flow valve, such as a multi-stage passive damper valve or a controlled variable flow valve for example. To this end, between each respective system fluid pressure accumulator 91, 92, 93, 94 and the respective system conduit 23', 24', 25', 26' is shown an optional respective accumulator valve 95 which provides damping, restriction and/or lockout of the resilience of the respective accumulator from the respective system conduit or the remainder of the respective system volume.

The arrangement of front and back pairs of cross-connected double-acting control rams can be used to provide support of at least a portion of the body and with resilience such as the illustrated accumulators provides a heave stiffness and a pitch stiffness which is the same as the heave stiffness. The arrangement also provides a roll stiffness and a warp stiffness which are both higher than the heave stiffness and pitch stiffness.

Each front left, front right, back left or back right system conduit 23', 24', 25' or 26' and its associated compression chamber 19, 20, 21 or 22; rebound chamber 72, 71, 74 or 73; and any associated resilience such as respective system fluid pressure accumulator 91, 92, 93 or 94 are connected to the respective compression conduit 23, 24, 25 or 26 forming a respective compression control volume 27, 28, 29 or 30. For example, the front left compression control volume 27 includes the front left compression chamber 19 of front left control ram 15", the front left system conduit 23', the front right rebound chamber 72 of front right double acting control ram 16", the liquid chamber of front left accumulator 91 and the front left compression conduit 23.

Again the connectivity of the first and second diagonal reversible pumps 31, 32 is the same as in FIGS. 1 and 2. That is, the first diagonal reversible pump 31 is connected between the front left compression conduit 23 and the back right compression conduit 26 to enable fluid to be transferred between the front left compression control volume 27 and the back right compression control volume 30. The second diagonal reversible pump 32 is connected between the front right compression conduit 24 and the back left compression conduit 25 to enable fluid to be transferred between the front right compression control volume 28 and the back left compression control volume 29. The operation of the first and second diagonal reversible pumps 31, 32 can also be the same as described with respect to FIG. 1 to provide adjustment of the roll attitude and pitch attitude of the body or chassis 2.

As would be apparent to one skilled in the art, the compression conduits 23, 24, 25, 26 and/or a portion of the system conduits 23', 24', 25', 26' may be or include at least one respective passage in a manifold block, pipe and/or flexible hose.

Figure 6:
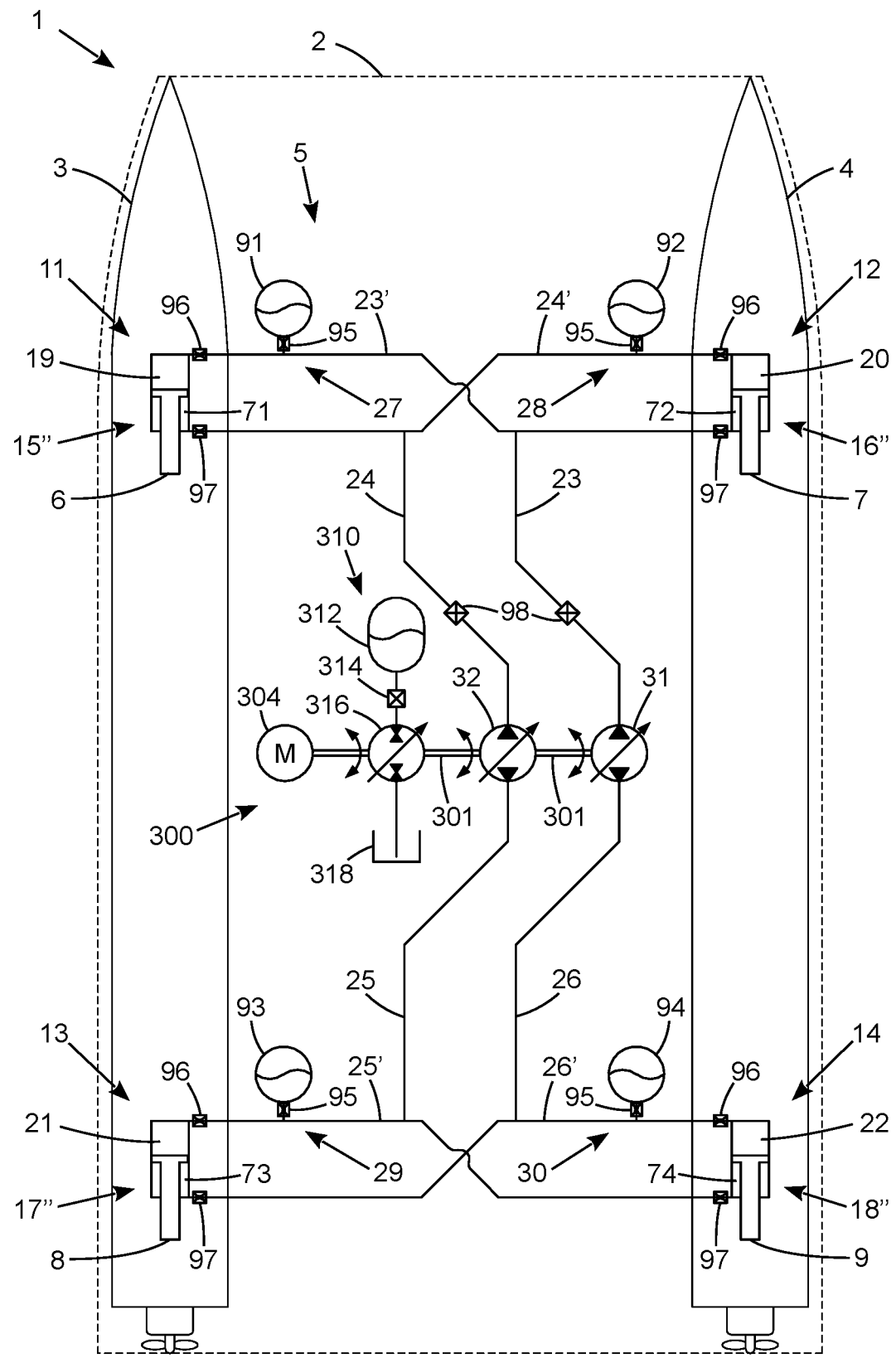
FIG. 6 is a schematic view of a fifth possible form of the present invention with control components added.

Similarly, any conduit can include a damper valve or orifice restriction. These can be used to damp resonant frequencies in the system, or to limit the rate and magnitude of displacement of the control rams. For example, as shown in FIG. 6 (which shows the same arrangement of front and back pairs of cross-connected double-acting control rams as FIG. 5) a respective compression damper valve 96 can be provided between a respective compression chamber 19, 20, 21, 22 of a respective support arrangement 11, 12, 13, 14 and the respective system conduit 23', 24', 25', 26'. Also shown in FIG. 6 are optional respective rebound damper valves 96, each provided between a respective rebound chamber 71, 72, 73, 74 of a respective support arrangement 11, 12, 13, 14 and the associated system conduit 24', 23', 26', 25'. Alternatively, such compression or rebound damper valves could be placed in-line in the individual system conduits remote from the double-acting control rams 15", 16", 17", 18".

To limit or prevent unwanted flow through the first and second diagonal reversible pumps 31, 32, valves 98 can be provided integral with the pumps or in at least one of the front left or back left compression conduits 23, 25 and in at least one of the front right or back right compression conduits 24, 26. If the valves 98 are lockout valves as shown in FIG. 6, they can also provide a fail-safe function in addition to preventing the unnecessary power consumption of correcting for unwanted displacement of fluid between the front and back system volumes when the pumps 31, 32 are idle and preventing unwanted drift in the pitch attitude of the body when at rest with the motor 304 not running for example.

FIG. 6 also shows a drive arrangement 300 for the first and second diagonal reversible pumps 31, 32. Each diagonal reversible pump 31, 32 can be a variable displacement pump such as a swash plate pump and can be driven for example by a belt, gear or typically a shaft 301. In its simplest form the two diagonal reversible pumps 31, 32, are directly driven by a single shaft, from a motor 304. However each pump can be coupled to the shaft or other drive via a clutch to selectively allow the pump to be driven. Similarly the individual diagonal reversible pumps 31, 32 can be driven by individual shafts driven in turn by one or more motors. The motor 304 can be a diesel motor, other form of combustion motor, an electrical motor or any other form of motor.

Preferably the drive arrangement 300 also includes some form of hydraulic or electrical energy accumulator or power harvesting arrangement 310. If just an energy accumulator arrangement is used, it can be charged by the motor when the power requirements of the diagonal reversible pumps is low and then supply larger amounts of peak energy to the pumps than the motor is able to supply on its own. However, ideally the drive arrangement 300 includes a power harvesting arrangement 310 in which the energy accumulator 312 can be charged by both the motor 304 and the first and/or second diagonal pumps 31, 32. This allows power from unwanted pitch and roll motions of the body relative to the front left, front right, back left and back right support points to be harvested for resupply at times of high demand.

In FIG. 6 a hydraulic form of the power harvesting arrangement 310 is shown including a fluid pressure form of the energy accumulator 312, an accumulator lockout valve 314, a variable displacement bi-rotational pump/motor 316, and a fluid reservoir 318. The pump/motor 316 can use energy from the motor 304 and/or the pumps 31, 32 to draw fluid from the reservoir 318 and pump it into the energy accumulator 312, which in this example is a hydro-pneumatic fluid pressure accumulator. Conversely, when the pumps 31, 32 require more energy than is available from the motor 304, energy can be released from the energy accumulator 312 either to provide fast initial response as the motor 304 increases in speed and energy output, or to provide additional power at peak requirements.

The energy is released from the energy accumulator 312 in the form of high pressure fluid to drive the motor/pump 316, driving the shaft 301 and returning low pressure fluid to the reservoir 318. Valve 314 can be used to control or block fluid from exiting the accumulator 312. This can be used to control the return of fluid through the motor/pump 316 or to retain energy within the fluid volumes of the accumulator 312 by preventing pressurised fluid from leaving the accumulator.

Figure 7:
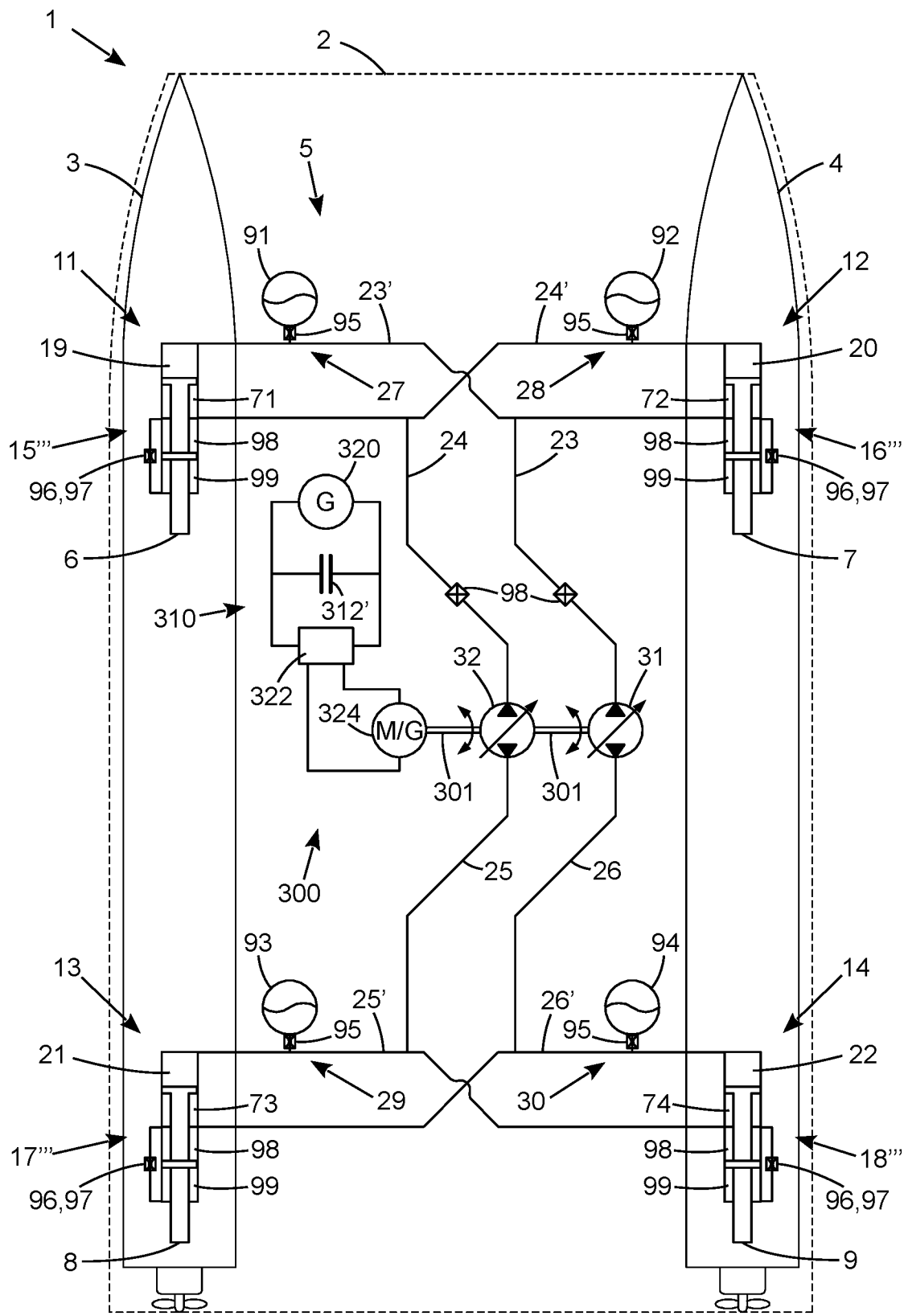
FIG. 7 is a schematic view of a sixth possible form of the present invention showing alternative control components.

FIG. 7 shows an alternative power harvesting arrangement 310 applied to a modified suspension system 5 having the same fundamental arrangement of front and back pairs of cross-connected double-acting control rams as FIGS. 5 and 6. However, whereas no damper valves were shown on the individual support arrangements 11, 2, 13, 14 in FIG. 5 and individual compression and rebound damper valves 96, 97 were shown on the control rams 15", 16", 17", 18" in FIG. 6, FIG. 7 shows control rams 15''', 16''', 17''', 18''' each incorporating an additional compression chamber 98 and rebound chamber 99 to provide damping using separate volumes to the system volumes. In the illustrated example, the additional compression and rebound chambers 98, 99 of each control ram are communicated via a combined compression and rebound damper valve 96, 97. As in this example, the additional compression and rebound chambers have equal cross-sectional area, the need for resilience is minimal, to compensate for fluid volume changes due to temperature variations.

The power harvesting arrangement 310 in FIG. 7 is an electrical type, the power being provided by a generator 320, such as a combustion engine powered generator. The energy accumulator 312' is electrical, a super-capacitor in this example, essentially in parallel with the generator 320 and a controller 322 which controls the flow of power to and from the motor/generator 324 driving or being driven by the diagonal reversible pumps 31, 32 on the shaft 301. When the pumps 31, 32 require less power than is being generated by the generator 320, super-capacitor or energy accumulator 312' is charged, storing energy. When the pumps 31, 32 require more energy that the generator 320 can supply, energy can be provided by the super-capacitor or energy accumulator 312' to meet the peak energy demand of the motor/generator 324 to drive the pumps 31, 32.

Figure 8:
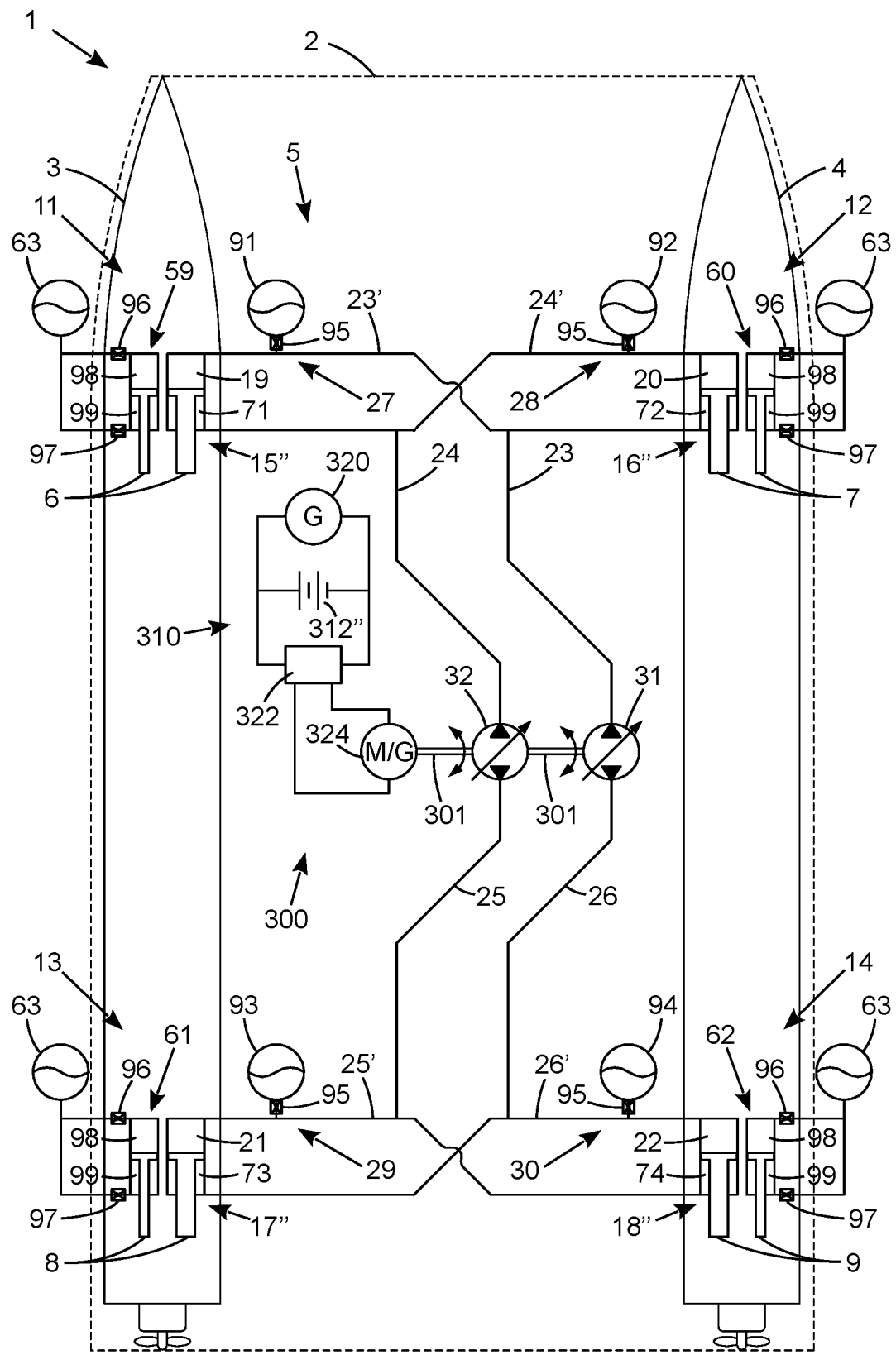
FIG. 8 is a schematic view of a seventh possible form of the present invention showing further alternative control components.

A similar electrical type of power harvesting arrangement 310 is shown in FIG. 8, the only difference being that the energy accumulator 312" is shown as a battery instead of the super-capacitor of FIG. 7. The operation is similar to that of the power harvesting arrangement of FIG. 7. separate damper cylinder FIG. 8 shows a modified suspension system 5 having the same fundamental arrangement of front and back pairs of cross-connected double-acting control rams as FIGS. 5, 6 and 7. However, whereas no damper valves were shown on the individual support arrangements 11, 2, 13, 14 in FIG. 5 and individual compression and rebound damper valves 96, 97 were shown on the control rams 15", 16", 17", 18" in FIG. 6, in FIG. 8 the individual compression and rebound damper valves 96, 97 are provided on each of the respective separate front left, front right, back left or back right damper cylinders 59, 60, 61, 62. Each respective damper cylinder is located in parallel to the respective control ram 15", 16", 17", 18" between the body 2 and the respective front left, front right, back left and back right point 6, 7, 8, 9. As the damper cylinders 59, 60, 61, 62 each have an uneven area of compression chamber 98 to rebound chamber 99, resilience is required to absorb or compensate for the change in rod volume inside the damper cylinder with compression and rebound travel.

This is provided by a fluid pressure accumulator 63 on each damper cylinder 59, 60, 61,62 which can also be used to ensure the pressures in the damper cylinder remain positive to improve fluid life and to minimise the change in average pressures due to temperature changes.

Figure 9:
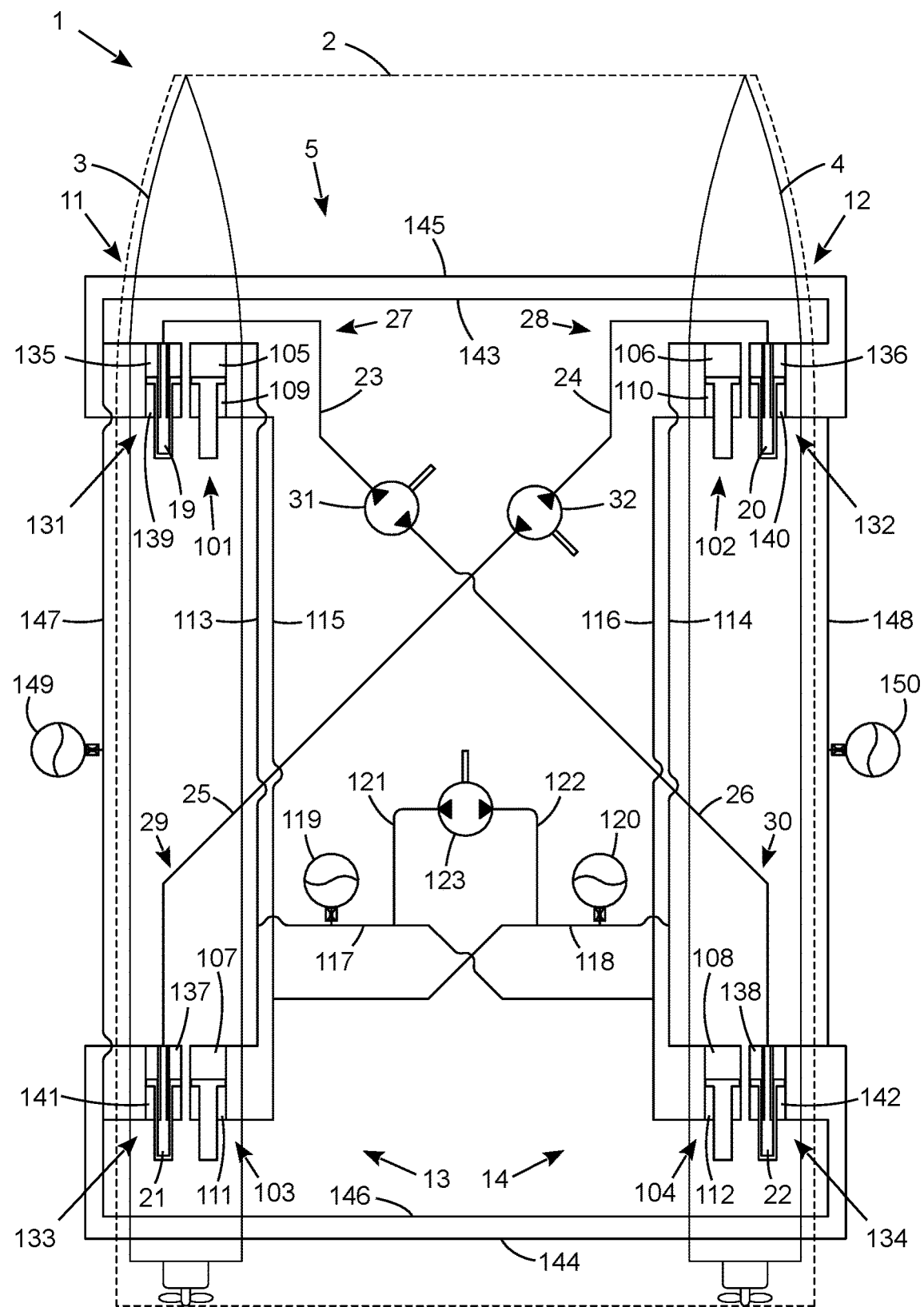
FIG. 9 is a schematic view of an eighth possible form of the present invention.

The suspension system 5 in FIG. 9 comprises the control ram arrangement of FIG. 1 incorporated into a modal suspension system. In each of the respective front left, front right, back left and back right support arrangements 11, 12, 13, 14, the modal suspension system comprises a respective roll ram 101, 102, 103, 104 and a respective pitch ram 131, 132, 133, 134. The roll rams and the pitch rams are ideally double-acting as shown, although single-acting pitch rams are feasible.

Each of the respective roll rams 101, 102, 103, 104 includes a respective front left, front right, back left or back right roll compression chamber 105, 106, 107, 108 and a respective roll rebound chamber 109, 110, 111, 112. The front left roll compression chamber 105 is connected to the back left roll compression chamber 107 by a left roll compression conduit 113. The front right roll compression chamber 106 is connected to the back right roll compression chamber 108 by a left roll compression conduit 114. The front left roll rebound chamber 109 is connected to the back left roll rebound chamber 111 by a left roll rebound conduit 115. The front right roll rebound chamber 110 is connected to the back right roll rebound chamber 112 by a left roll rebound conduit 116. The left roll compression conduit 113 is connected to the right roll rebound conduit 116 by the left roll cross conduit 117 forming a left roll compression volume and similarly the right roll compression conduit 114 is connected to the left roll rebound conduit 115 by the left roll cross conduit 118 forming a right roll compression volume. A left roll compression accumulator 119 is connected to the left roll compression volume and a right roll compression accumulator 120 is connected to the right roll compression volume. This arrangement provides a higher roll stiffness than heave stiffness from the roll rams 101, 102, 103, 104 in the support arrangements.

A powered roll-in function can be provided using the roll reversible pump 123 to transfer fluid between the left and right roll volumes via the left roll adjustment conduit 121 and the right roll adjustment conduit 122. Providing such a roll adjustment arrangement in a suspension system where the first and second diagonal reversible pumps 31, 32 are provided can be appropriate, particularly where there is little resilience in the front left, front right, back left and back right control volumes 27, 28, 29, 30. For example, the roll reversible pump may be operated while the vessel is in transit and the first and second diagonal reversible pumps 31, 32 may be operated when the chassis roll and pitch attitude is being controlled during transfer operations.

Each of the respective pitch rams 131, 132, 133, 134 includes a respective front left, front right, back left or back right pitch compression chamber 135, 136, 137, 138 and a respective pitch rebound chamber 139, 140, 141, 142. The front left pitch compression chamber 135 is connected to the front right pitch compression chamber 136 by a front pitch compression conduit 143. The back left pitch compression chamber 137 is connected to the back right pitch compression chamber 138 by a back pitch compression conduit 144. The front left pitch rebound chamber 139 is connected to the front right pitch rebound chamber 140 by a front pitch rebound conduit 145. The back left pitch rebound chamber 141 is connected to the back right pitch rebound chamber 142 by a back pitch rebound conduit 146. The front pitch compression conduit 143 is connected to the back pitch rebound conduit 146 by the front pitch cross conduit 147 forming a front pitch compression volume and similarly the back pitch compression conduit 144 is connected to the front pitch rebound conduit 145 by the back pitch cross conduit 148 forming a right roll compression volume. A front pitch compression accumulator 149 is connected to the front pitch compression volume and a back pitch compression accumulator 150 is connected to the back pitch compression volume. This arrangement provides a higher pitch stiffness than heave stiffness from the pitch rams 131, 132, 133, 134 in the support arrangements.

Figure 14:
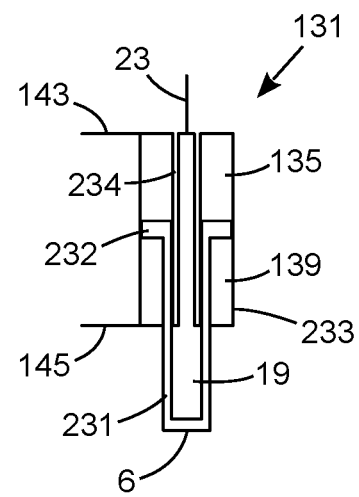
FIG. 14 is a schematic view of a portion of one of the support arrangements of FIG. 6.

Each pitch ram is shown as a triple-chamber ram effectively incorporating the respective control ram, the front right pitch ram being shown larger in FIG. 14 for clarity. So referring again to FIG. 9, in the front left pitch ram 131, a second compression chamber 19 is provided, forming the front left compression chamber 19 from the front left control ram of FIG. 1 which together with the front left compression conduit 23 forms the front left compression control volume 27. Similarly, in the front right pitch ram 132, a second compression chamber 20 is provided, forming the front right compression chamber 20 from the front right control ram of FIG. 1 which together with the front right compression conduit 24 forms the front right compression control volume 28. In the back left pitch ram 133, a second compression chamber 21 is provided, forming the back left compression chamber 21 from the front left control ram of FIG. 1 which together with the back left compression conduit 25 forms the back left compression control volume 29. In the back right pitch ram 134, a second compression chamber 22 is provided, forming the back left compression chamber 22 from the front left control ram of FIG. 1 which together with the back right compression conduit 26 forms the back right compression control volume 30.

Although resilience may be provided in the respective compression control volumes 27, 28, 29, 30, if said respective compression control volumes are pressurised when substantially stationary, such as during many transfer operations, and essentially open to tank during transit where input accelerations are higher, resilience may not be required in the control volumes. The lack of deliberately provided additional resilience improves response of the pitch and roll attitude control arrangement when operational. The compliance provided by the interaction of the hulls with the water can be sufficient to prevent unacceptably high pressure peaks in some or most transfer operations, although this is dependent on the hull form and the typical sea states encountered. Again operation of the first and second diagonal reversible pumps 31, 32 can be as discussed with respect to FIG. 1.

Figure 10:
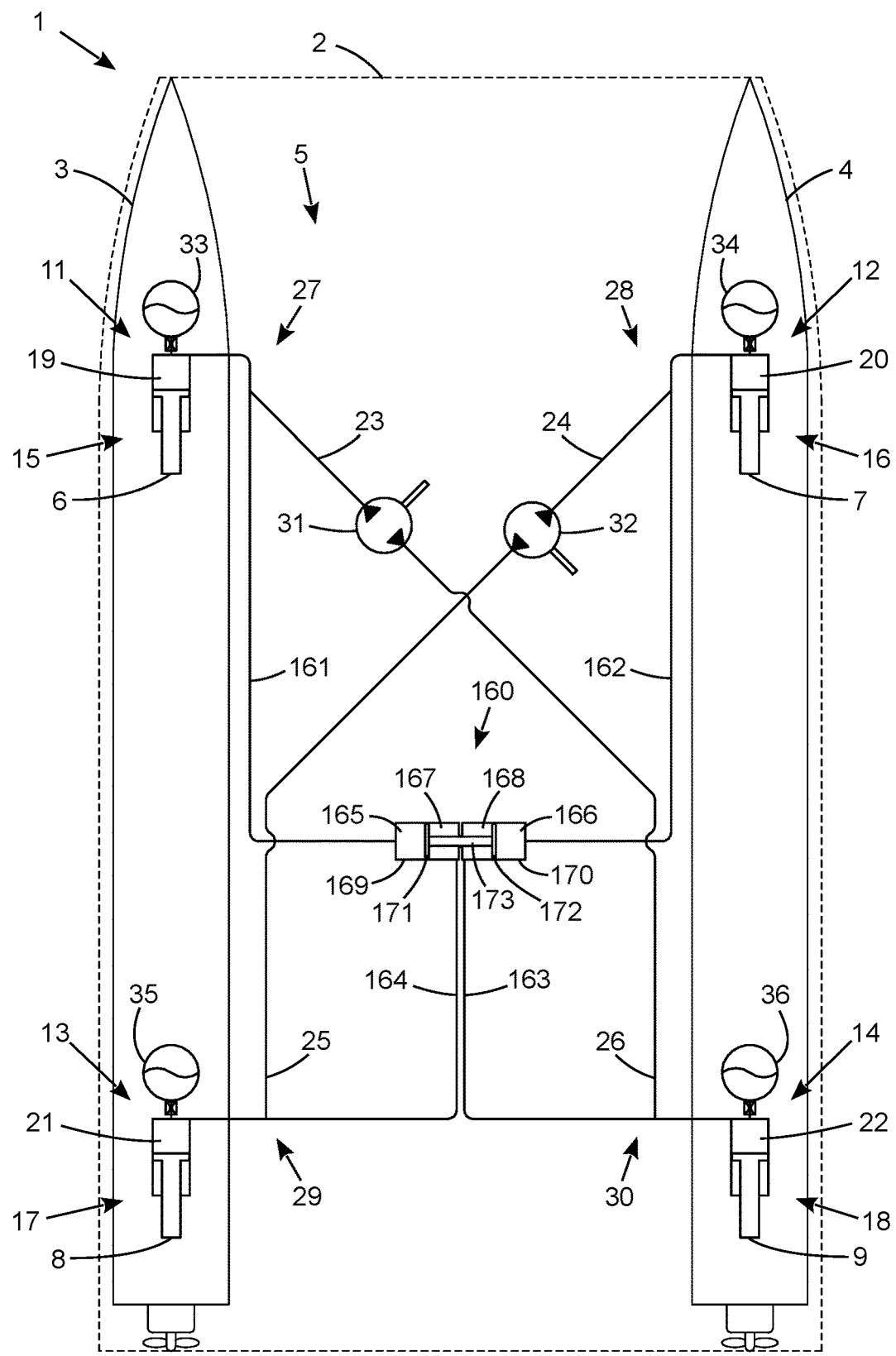
FIG. 10 is a schematic view of a seventh possible form of the present invention.

FIG. 10 adds a warp mode device into the suspension system 5 of FIG. 1 to remove the warp stiffness of the arrangement of control rams 15, 16, 17, 18.

This device is a warp load distribution unit 160 which in this example comprises two axially aligned cylinders, the first cylinder 169 and the second cylinder 170, each divided into two chambers 165 and 167 or 168 and 166 by a respective movable member such as the first piston 171 and the second piston 172. The two movable members are rigidly connected by a rod 173 passing in this example through the chambers 167 and 168. Front left warp conduit 161 connects the front left system chamber 165 of the warp load distribution unit 160 to the front left compression control volume 27. Front right warp conduit 162 connects the front right system chamber 166 of the warp load distribution unit 160 to the front right compression control volume 28. Back left warp conduit 163 connects the back left system chamber 167 of the warp load distribution unit 160 to the back left compression control volume 29. Back right warp conduit 164 connects the back right system chamber 168 of the warp load distribution unit 160 to the back right compression control volume 30. So as the front left and back right control rams 15 and 18 compress and displace fluid into the front left and back right system chambers 165, 168 of the warp load distribution unit 160, the piston rod assembly (comprising pistons 171, 172 and the rod 173) displaces within the cylinders 169, 170 of the warp load distribution unit 160, displacing fluid out of the front right and back left system chambers 166 and 167 into the extending front right and back left control rams 16, 17. The warp load distribution unit 160 thus removes the warp stiffness of the arrangement of control rams 15, 16, 17, 18 without removing the roll, pitch or heave stiffness.

Figure 11:
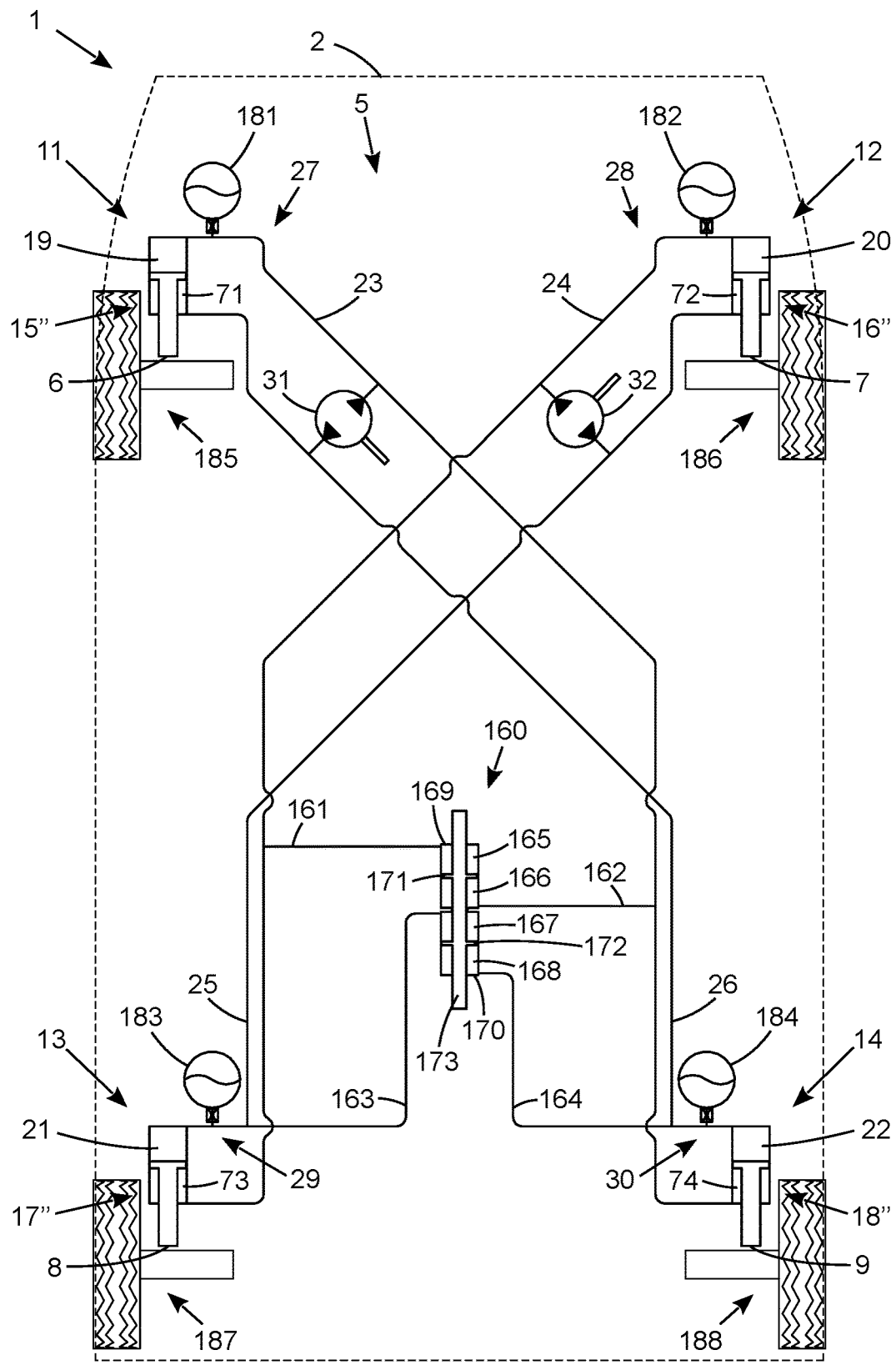
FIG. 11 is a schematic view of a vehicle incorporating an eighth possible form of the present invention.

An alternative warp load distribution unit 160 is shown in FIG. 11 where the rod 173 passes through all of the system chambers. Although all system chambers are shown with an equal effective piston area, the front compression control volumes 27, 28 are connected to the first cylinder 169 and back compression volumes 29 and 30 are connected to the second cylinder 170. Such a connection sequence is appropriate if a different bore is used from the first cylinder 169 to the second cylinder 170. The basic functionality is the same as that of the warp load distribution unit 160 in FIG. 10. The piston rod assembly (171, 172, 173) displaces with warp motions to displace fluid from the first diagonal pair of (front left and back right) compression control volumes 27, 30 to the second diagonal pair of (front right and back left) compression control volumes 28, 29.

Also in FIG. 11 the control rams 15", 16", 17", 18" are double-acting, but unlike in FIG. 3, they now have unequal piston areas, i.e. the rod passes through the rebound chamber 71, 72, 73, 74 only, not the compression compression 19, 20, 21, 22. The effect of this is that the roll and pitch linear stiffness rates are equal and both are higher than the heave stiffness. Respective front left, front right, back left and back right fluid pressure accumulators 181, 182, 183, 184 are shown to provide a controlled amount of resilience, each accumulator being shown including a damper valve between the gas volume and the compression control volume to which it is connected. Although the suspension system 5 is shown applied to the chassis 2 of a vehicle such as a car or truck, the suspension system is equally applicable to vessels. In this vehicle example, the four points 6, 7, 8, 9 to which the rams are connected are on respective front left, front right, back left or back right wheel assemblies 185, 186, 187, 188.

Figure 12:
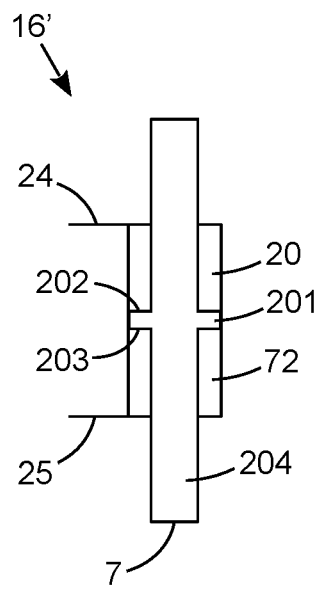
FIG. 12 is a schematic view of one of the control rams of FIG. 3.

FIG. 12 is a view of the front right control ram 16' from FIG. 3. The rod 204 extends from both sides of the piston 201 through both the compression chamber 20 and the rebound chamber 72. If the rod diameter is the same on both sides of the piston then the compression piston area on the compression face 202 of the piston 201 (i.e. the pressure area of the compression chamber) is equal to the rebound piston area on the rebound face 203 of the piston 201 (i.e. the pressure area of the rebound chamber).

Figure 13:
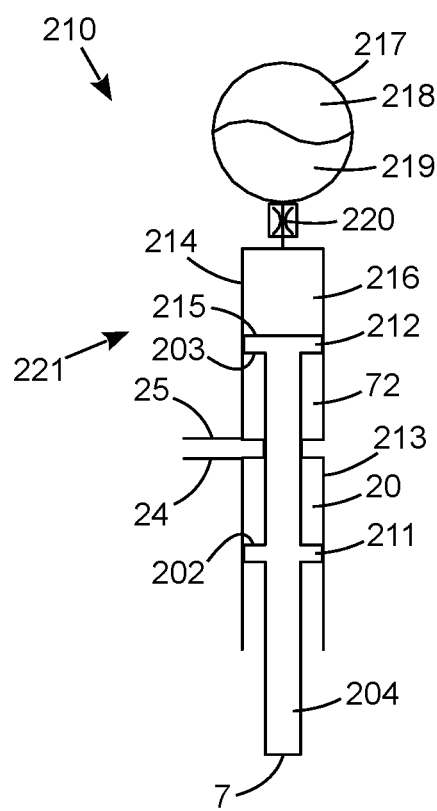
FIG. 13 is a schematic view of a support arrangement according to one form of the present invention.

FIG. 13 shows a triple-chamber ram 210 which can for example be used to replace the front right double-acting control ram 16' and the air spring 80 in FIG. 3. The rod 204 extends through the lower piston 211 and the compression chamber 20 in the first cylinder 213 and through the rebound chamber 72 in the second cylinder 214, terminating at the upper piston 212. If the first and second cylinders are of equal diameter, then the control compression face 202 and the control rebound face 203 are equal in area providing the same function as the control ram 16' in FIG. 3, i.e. a control ram with zero heave stiffness. However, the triple chamber ram 210 can provide a heave stiffness from the support compression chamber 216 and the fluid pressure accumulator 217, these two elements being the key elements of a hydro-pneumatic support ram or single-acting cylinder 221. The support compression face 215 of the upper piston 212 together with the bore of the cylinder 214 define the support compression chamber 216, which is connected via an optional damper valve 220 to the fluid volume 219 of the fluid pressure accumulator 217. The gas volume of the pressure accumulator 217 is indicated at 218.

FIG. 14 shows the combined front left pitch and control ram from FIG. 9. The external rod 231 is hollow to house the compression chamber 19 of the front left control ram 131 and includes a piston 232 sliding in cylinder 233 to define the front left pitch compression chamber 135 and the front left pitch rebound chamber 139. Passing through the front left pitch compression chamber 135 into the hollow external rod 231 is a hollow internal rod 234 through which passes flow between the front left compression control chamber 19 and the front left compression conduit 23.

Figure 15:
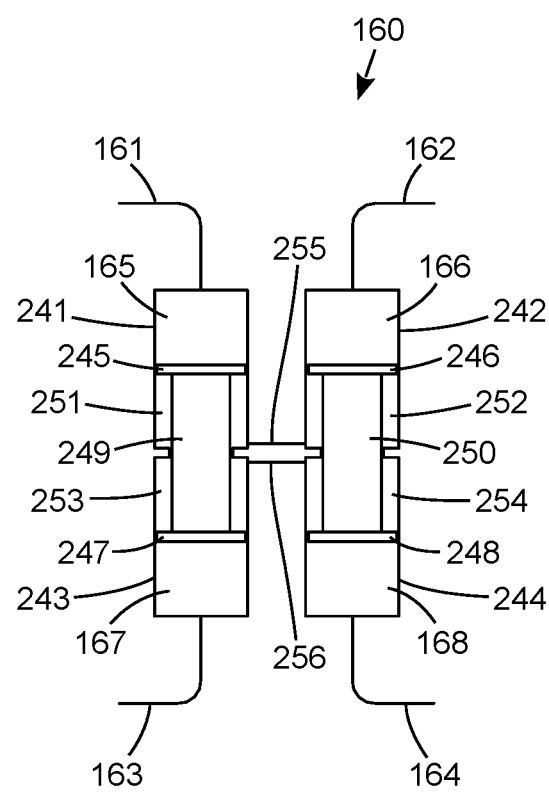
FIG. 15 is a schematic view of an alternative warp load distribution unit according to one form of the present invention.

FIG. 15 shows one alternative arrangement of warp load distribution unit 160, one that can add a pitch resilience if required. A first piston 245 divides a first cylinder 241 into the front left system chamber 165 and the front left pitch chamber 251. The second piston 246 divides a second cylinder 242 into the front right system chamber 166 and the front right pitch chamber 252. A third piston 247 divides a third cylinder 243 (axially aligned with the first cylinder 241) into the back left system chamber 167 and the back left pitch chamber 253. The fourth piston 248 divides a fourth cylinder 244 (axially aligned with the second cylinder 242) into the back right system chamber 168 and the back right pitch chamber 254. The front left and front right pitch chambers 251, 252 are connected by a front pitch conduit 255 which can optionally be connected to a front pitch fluid pressure accumulator (not shown). The back left and back right pitch chambers 251, 252 are connected by a back pitch conduit 256 which can optionally be connected to a front pitch fluid pressure accumulator (not shown). The optional pitch accumulators can add resilience in the pitch mode, otherwise the warp load distribution unit of FIG. 15 operates in a similar manner as those in FIGS. 9 and 10. The pitch resilience (if provided) can be switched. Alternatively, the warp load distribution unit of FIG. 15 can be connected to provide additional roll resilience if required.

Figure 16:
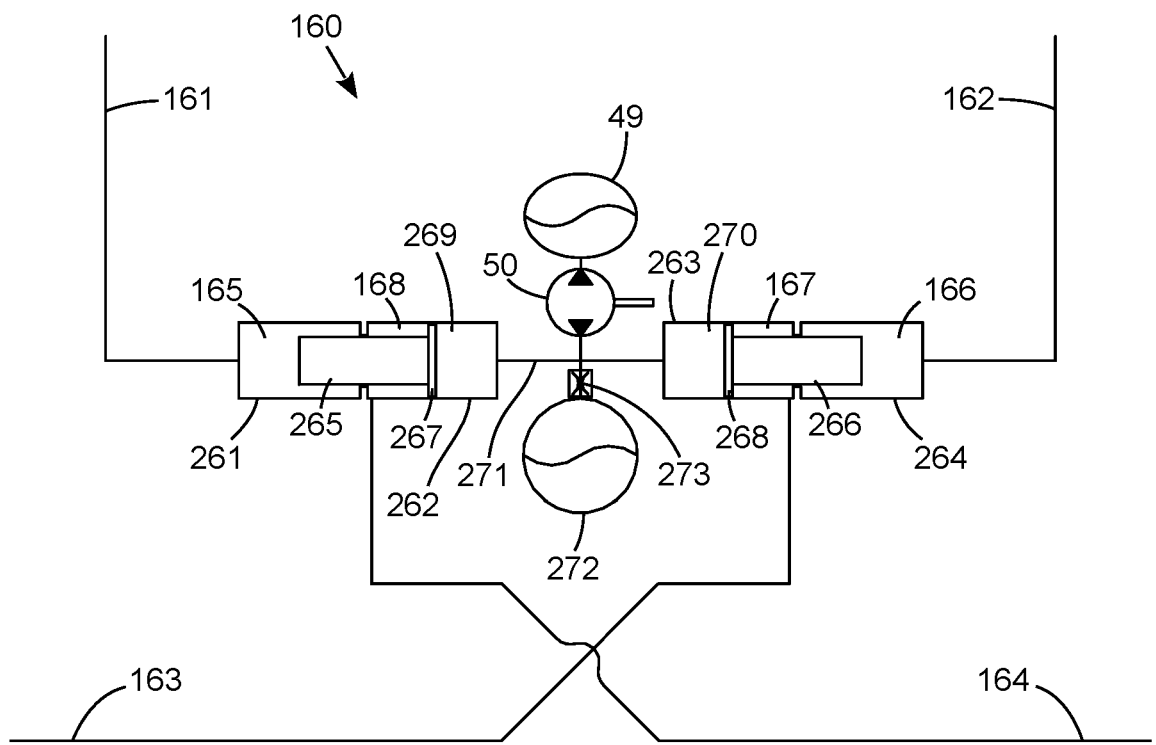
FIG. 16 is a schematic view of a further alternative warp load distribution unit according to one form of the present invention.

FIG. 16 shows a further alternative arrangement of warp load distribution unit 160, one that can add heave resilience and/or adjustment if required. The first cylinder 261 is axially aligned with the second cylinder 262 in which the first piston 267 is located. Fixed to the first piston 267 and extending into the first cylinder 261 is a first rod 265 which together with the first cylinder defines the front left system chamber 165. The first piston 267, first rod 265 and second cylinder 262 together define the back right system chamber 168. On the opposite side of the first piston 267 is the first diagonal heave chamber 269.

Similarly, the third cylinder 263 is axially aligned with the fourth cylinder 264, the second piston 268 being located in the third cylinder 263. Fixed to the second piston 268 and extending into the fourth cylinder 264 is a second rod 266 which together with the fourth cylinder defines the front right system chamber 166. The second piston 268, second rod 266 and third cylinder 263 together define the back left system chamber 167. On the opposite side of the second piston 268 is the second diagonal heave chamber 270.

The two heave chambers 269 and 270 are connected by a heave conduit which permits warp of the control rams (not shown) by transferring fluid between the first diagonal pair of rams (front left and back right control rams) and the second diagonal pair of rams (front right and back left control rams). Conversely the heave conduit permits fluid from both of the heave chambers 269, 270 to flow into and out of at least one optional heave fluid pressure accumulator 272, via an optional heave damper valve 273.

When, as shown, the load distribution unit of FIG. 16 includes a heave reversible pump 50 between a heave adjustment accumulator 49 and the heave conduit 271, the heave position of the chassis (not shown) can be adjusted as in FIG. 2.

Features or elements from some of the Figures can be applied to other Figures. For example the load distribution units from FIGS. 10, 11, 15 and 16 are interchangeable and could also be added into the suspension systems in FIGS. 1, 2, 3 and 4.

Also features or elements in the Figures may be replaced with equivalent or similar feature or elements. For example, the resilient supports may be air springs, torsion bars, hydro-pneumatic struts or any other known type or combination of resilient support.

Any form of device may be used to capture, store and release energy in coordination with the pitch and roll control of body attitude, for example by using the pump motors as electrical generators or by using the pumps to drive fluid into storage accumulator(s) and releasing as required to supplement the motor power.

Pumps may drive fluid amplifiers, the fluid amplifiers being in the diagonal conduits in place of the reversible pumps.

Damping may be provided on the support rams or in the conduits. Alternatively damping may be provided in additional hydraulic rams separate or in parallel to the support rams. Damper valves may be provided directly on the resilience, such as on the accumulators as shown in FIG. 1 and in FIGS. 5 to 11. Additionally or alternatively damper valves may be provided on the control rams. Any or all of these damper valves can be fixed (such as an orifice or orifice in combination with shims). Alternatively, any or all of these damper valves can be switchable between at least two settings such as a (relatively soft) transit setting and a (relatively firm) transfer or loitering setting. Alternatively, any or all of these damper valves may be variable damper valves.

A switchable or variable damper valves may be referred to as a controllable damper valve.

Other modifications and variations as would be apparent to a skilled addressee are deemed to be within the scope of the present invention.

The invention claimed is:

1. A suspension system for supporting a body relative to at least four points, the at least four points including a front left point, a front right point, a back left point and a back right point, the suspension system including:
    a front left support arrangement between the front left point and the body, a front right support arrangement between the front right point and the body, a back left support arrangement between the back left point and the body and a back right support arrangement between the back right point and the body,
    each respective front left, front right, back left and back right support arrangement including a respective control ram, each control ram including a respective compression chamber and a respective rebound chamber,
    the front left compression chamber and the front right rebound chamber being in fluid communication and forming at least a part of a front left compression control volume,
    the front right compression chamber and the front left rebound chamber being in fluid communication forming at least part of a front right compression control volume,
    the back left compression chamber and the back right rebound chamber being in fluid communication and forming at least a part of a back left compression control volume,
    the back right compression chamber and the back left rebound chamber being in fluid communication forming at least part of a back right compression control volume,
    a control arrangement including a first diagonal fluid transfer device for displacing fluid between the front left compression control volume and the back right compression control volume and a second diagonal fluid transfer device for displacing fluid between the front right compression control volume and the back left compression control volume, each of the first and second diagonal fluid transfer devices having a forward direction and a reverse direction, and
    wherein four possible permutations exist for simultaneously driving the first and second diagonal fluid transfer devices in the forward and backward directions, each permutation corresponding to causing the body to one of:
    roll left,
    roll right,
    pitch to a front of the body, or
    pitch to a back of the body.

2. A suspension system according to claim 1 wherein each support arrangement includes:
    a respective resilience arrangement acting on the respective compression control volume and
    a respective damping arrangement to controllably restrict and/or selectively prevent compression and/or expansion of at least a portion of the respective resilience arrangement.

3. A suspension system according to claim 2 wherein each respective damping arrangement includes a variable or controllable restriction to vary the amplitude, speed and/or acceleration of the compression and/or expansion of at least a portion of the respective resilience arrangement, the variable or controllable restriction being varied or controlled at least in dependence on an operational mode of the control arrangement.

4. A suspension system according to claim 2 wherein each damping arrangement includes a respective lockout to selectively prevent compression and/or expansion of at least a portion of the respective resilience arrangement in dependence on an operational mode of the control arrangement.

5. A suspension system according to claim 1 wherein the control arrangement includes at least a transit mode in which the roll attitude of the body is adjusted to roll the body into a turn.

6. A suspension system according to claim 1 wherein the control arrangement includes at least a loitering mode in which the roll attitude and the pitch attitude of the body are adjusted to substantially maintain roll and pitch attitude of the body.

7. A suspension system according to claim 1 wherein the control arrangement includes at least a transfer mode in which the roll attitude and/or the pitch attitude of the body is adjusted.

8. A suspension system according to claim 2 wherein each resilience arrangement includes a respective fluid pressure accumulator in at least controllable or selective fluid communication with the respective compression control volume.

9. A suspension system according to claim 8 wherein each damping arrangement includes a respective restriction or damper valve to restrict fluid communication between the respective fluid pressure accumulator and the respective compression control volume.

10. A suspension system according to claim 8 wherein each damping arrangement includes a respective lockout valve to selectively limit or prevent fluid communication between the respective fluid pressure accumulator and the respective compression control volume.

11. A suspension system according to claim 2 wherein the respective resilience arrangement includes a respective resilient support in parallel with the respective control ram; and
    the respective damping arrangement includes a shock absorber in parallel with the respective resilient support.

12. A suspension system according to claim 11 wherein the respective resilient support includes a coil spring.

13. A suspension system according to claim 11 wherein the respective resilient support includes a pneumatic spring.

14. A suspension system according to claim 1 wherein the body is a chassis of a water-craft and the at least four points include a front left point and a back left point located on at least one left hull and a front right point and a back right point located on at least one right hull.

15. A suspension system according to claim 14 wherein the at least at least one left hull is a single left hull and the at least one right hull is a single right hull.

16. A suspension system according to claim 14 wherein the at least at least one left hull is a front left hull on which the front left point is located and a back left hull on which the back left point is located; and the at least one right hull is a front right hull on which the front right point is located and a back right hull on which the back right point is located.

17. A suspension system according to claim 1 wherein the body is a chassis of a vehicle and the front left point is located on a front left wheel assembly, the back left point is located on a back left wheel assembly, the front right point is located on a front right wheel assembly and the back right point is located on a back right wheel assembly.

18. A suspension system according to claim 1 wherein at least one respective fluid pressure accumulator is provided for at least one of the front left, front right, back left or back right compression control volumes respectively.

19. A suspension system according to claim 1 wherein the first diagonal fluid transfer device is a first diagonal reversible pump; and the second diagonal fluid transfer device is a second diagonal reversible pump.

20. A suspension system according to claim 1 wherein the first diagonal fluid transfer device includes a first diagonal fluid amplifier; and the second diagonal fluid transfer device includes a second diagonal fluid amplifier.

21. A suspension system according to claim 5 wherein the control arrangement includes at least a loitering mode in which the roll attitude and the pitch attitude of the body are adjusted to substantially maintain roll and pitch attitude of the body.

22. A suspension system according to claim 5 wherein the control arrangement includes at least a transfer mode in which the roll attitude and/or the pitch attitude of the body is adjusted.

23. A suspension system according to claim 6 wherein the control arrangement includes at least a transfer mode in which the roll attitude and/or the pitch attitude of the body is adjusted.

24. A suspension system according to claim 21 wherein the control arrangement includes at least a transfer mode in which the roll attitude and/or the pitch attitude of the body is adjusted.

\* \* \* \* \*